(12) United States Patent
Torzewski et al.

(10) Patent No.: US 12,419,208 B2
(45) Date of Patent: Sep. 23, 2025

(54) AUTOMATICALLY GENERATING TURNS ON AN AGRICULTURAL WORK MACHINE BASED UPON FIELD GEOMETRY

(71) Applicant: Deere & Company, Moline, IL (US)

(72) Inventors: Michael A. Torzewski, Waukee, IA (US); Noel R. Menard, Kyle, TX (US); Simon W. Schaefer, Ankeny, IA (US)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 18/350,230

(22) Filed: Jul. 11, 2023

(65) Prior Publication Data

US 2025/0017125 A1    Jan. 16, 2025

(51) Int. Cl.
*A01B 69/04* (2006.01)
*G05D 1/246* (2024.01)
*G05D 1/646* (2024.01)
*G05D 105/15* (2024.01)

(52) U.S. Cl.
CPC .......... *A01B 69/008* (2013.01); *G05D 1/246* (2024.01); *G05D 1/646* (2024.01); *G05D 2105/15* (2024.01)

(58) Field of Classification Search
None
See application file for complete search history.

(56) References Cited

U.S. PATENT DOCUMENTS

| | | | |
|---|---|---|---|
| 7,110,881 B2 | 9/2006 | Gray et al. | |
| 7,216,033 B2 | 5/2007 | Flann et al. | |
| 8,209,075 B2 | 6/2012 | Senneff et al. | |
| 11,224,154 B2 | 1/2022 | Dix | |
| 2014/0081568 A1* | 3/2014 | Pieper | G05D 1/0219 701/400 |
| 2019/0208695 A1* | 7/2019 | Graf Plessen | A01B 69/008 |
| 2019/0239416 A1* | 8/2019 | Green | G05D 1/0219 |

FOREIGN PATENT DOCUMENTS

| | | |
|---|---|---|
| DE | 102006019216 A1 | 10/2007 |
| DE | 102017103137 A1 | 8/2018 |

OTHER PUBLICATIONS

Zhang et al., "Study on path planning of mechanized harvesting of ratoon rice in the first season based on the capacitated arc routing problem model", Frontiers in Plant Science, Oct. 10, 2022, pp. 1-16 (Year: 2022).*
German Search Report issued in application No. 102024115220.6 dated Feb. 14, 2025, 08 pages.

* cited by examiner

*Primary Examiner* — Tamara L Weber
(74) *Attorney, Agent, or Firm* — Kelly, Holt & Christenson; Joseph R. Kelly

(57) ABSTRACT

An agricultural machine includes a turn generation system that identifies a turn start point and turn end point that indicate the starting point and ending point, respectively, of a turn that the agricultural machine will make to transition from a current pass to a subsequent pass. The guidance system identifies a turn contour and projects that contour onto a headland area of the field. The turn generation system generates a turn path based upon the turn starting and ending points and the turn path contour.

18 Claims, 18 Drawing Sheets

AUTOMATICALLY GENERATING TURNS ON AN AGRICULTURAL WORK MACHINE BASED UPON FIELD GEOMETRY

FIELD OF THE DESCRIPTION

The present description relates to agricultural machines. More specifically, the present description relates to generating automatic turns when navigating an agricultural machine through a field.

BACKGROUND

There are a wide variety of different types of agricultural machines. Some such machines include tillage machines, planting machines, harvesters, sprayers or other application equipment, among others.

Some agricultural machines have automated guidance systems that navigate the agricultural machines along guidance lines as the machine travels through a field. A guidance line may be obtained or generated by a guidance system on the agricultural machine. The guidance line may identify a set of points that are geographically located on the field and define a path that the guidance system is to follow. The guidance system navigates the agricultural machine along the path defined by the guidance line.

The discussion above is merely provided for general background information and is not intended to be used as an aid in determining the scope of the claimed subject matter.

SUMMARY

An agricultural machine includes a turn generation system that identifies a turn start point and a turn end point that indicate the starting point and ending point, respectively, of a turn that the agricultural machine will make to transition from a current pass to a subsequent pass through a field. The guidance system identifies a turn path contour corresponding to a boundary of a headland area and projects that contour onto the headland area of the field. The turn generation system generates a turn path based upon the turn starting and ending points and the turn path contour.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are many different types of agricultural machines. These agricultural machines often make headland turns at the end of passes through a field. Some such agricultural machines have automated navigation systems that automatically navigate the machine through a headland turn, from a current pass through the field to a next pass through the field. However, this can be problematic in certain ways.

Figure 1:
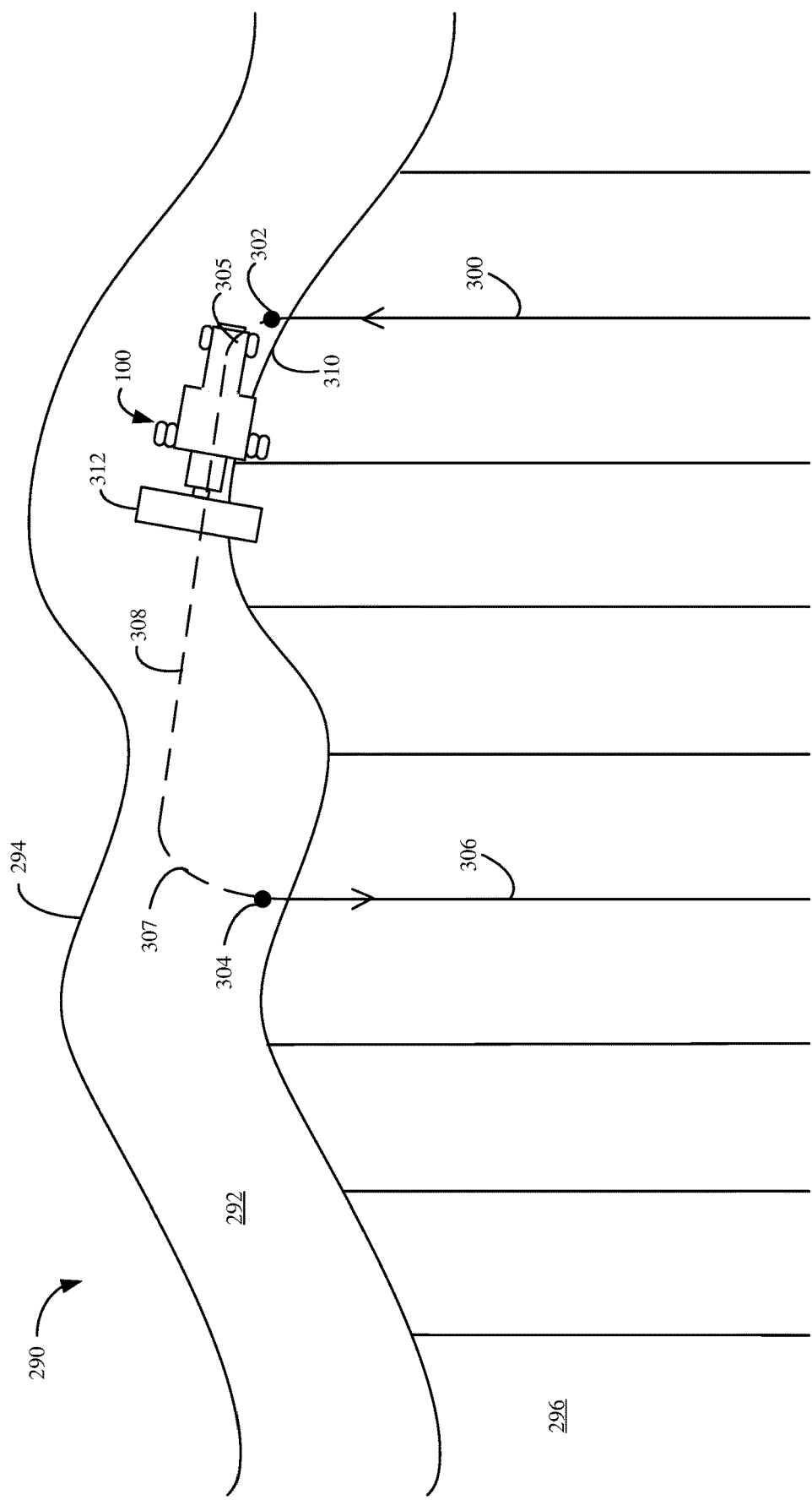
FIG. 1 is a pictorial illustration of a harvester making a headland turn.

In FIG. 1, a field 290 has a headland portion 292 where crop has already been harvested adjacent the external periphery or boundary 294 of field 290, and a standing crop portion (or primary planted area) 296 where crop is still standing and has yet to be harvested. In order to harvest the headland portion 292 of field 290, harvester 100 has illustratively made two passes through headland 292. In making those passes, harvester 100 followed the peripheral boundary 294 of field 290, thus generating the contour of the boundary 310 between the standing crop portion 296 of field 290 and headland 292. That is, the boundary 310 (between headland 292 and the standing crop portion 296) and the peripheral boundary 294 of field 290 are congruent and thus follow the same contour (or curvature).

The lines on standing crop portion 296 are guidance lines which define passes through field portion 296 that harvester 100 can make in order to harvest the standing crop in field portion 296. FIG. 1 shows that harvester 100 has finished a pass 300 through field 290 and is making a headland turn to commence a next subsequent pass 306 through field 290. In one example, in order to address logistical concerns and accommodate the turning radius limitations of harvester 100, harvester 100 may skip any number of guidance lines between a current pass (in FIG. 1 represented by guidance line 300) and a next subsequent pass (in FIG. 1 represented by guidance line 306).

Harvester 100 has an automation system that automatically calculates a route for a headland turn. The route identifies the end point 302 of the current pass 300 and the start point 304 of a next subsequent pass defined by guidance line 306. It can be seen that harvester 100 is skipping three guidance lines between passes 300 and 306. The automation system generates the route for the headland turn as a straight line defined by path 308 between the endpoint 302 of pass 300 and the start point 304 of pass 306 plus transitions 305 and 307. However, because of the contour of the boundary 310 between headland area 292 and standing crop in the field 290, the header 312 of harvester 100 will cross that boundary 310 if harvester 100 follows the path 308 defined for the headland turn.

Figure 2:
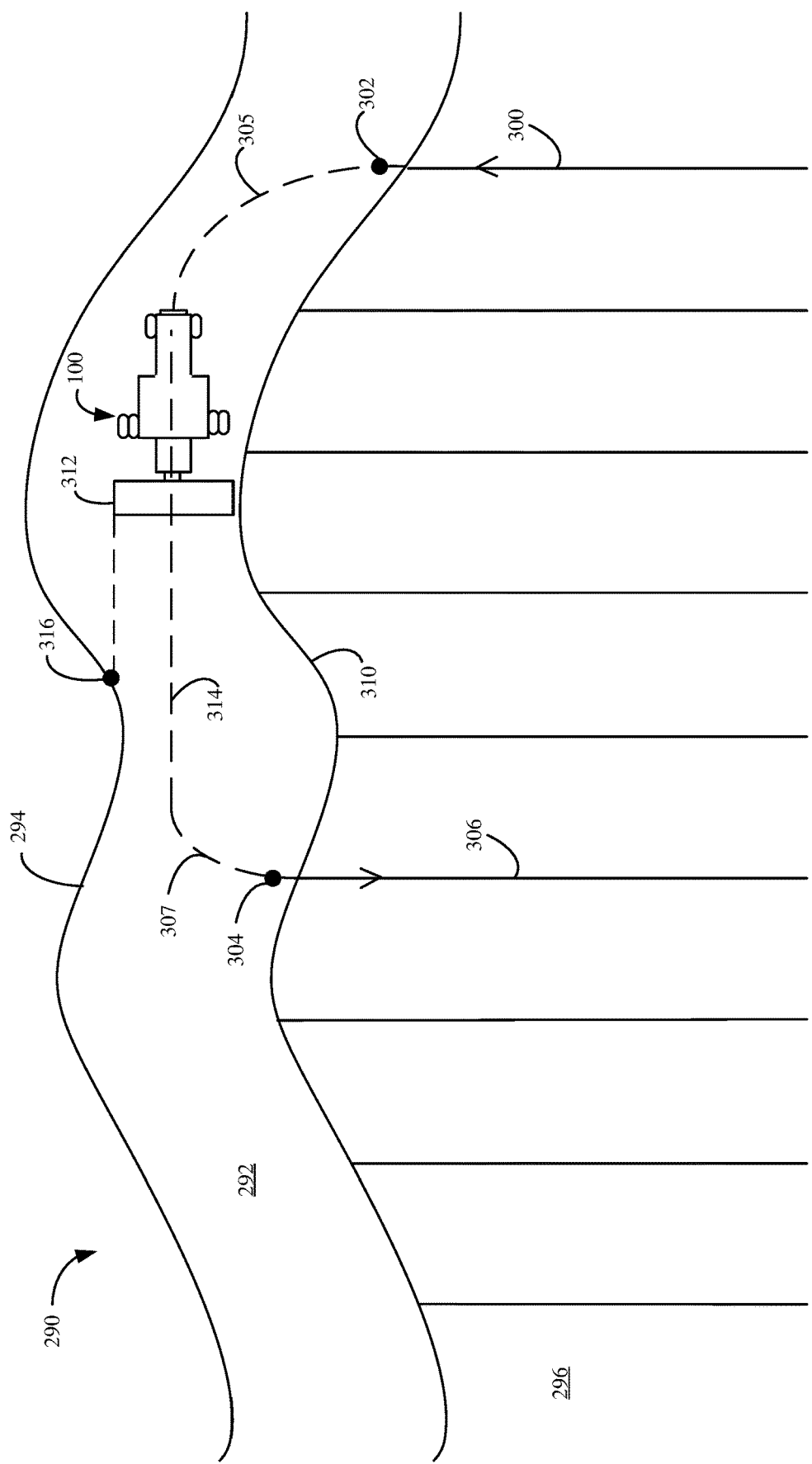
FIG. 2 is a pictorial illustration of a harvester making a headland turn.

FIG. 2 also shows that the automation system on harvester 100 has plotted a straight path 314 between the end point 302 of pass 300 and the start point 304 of pass 306 with transitions 305 and 307. However, because the external field boundary 294 of field 290 is contoured inwardly into the field 290, the header 312 of harvester 100 will cross the boundary 294 at point 316 if harvester 100 follows the automatically generated path 314.

Figure 3:
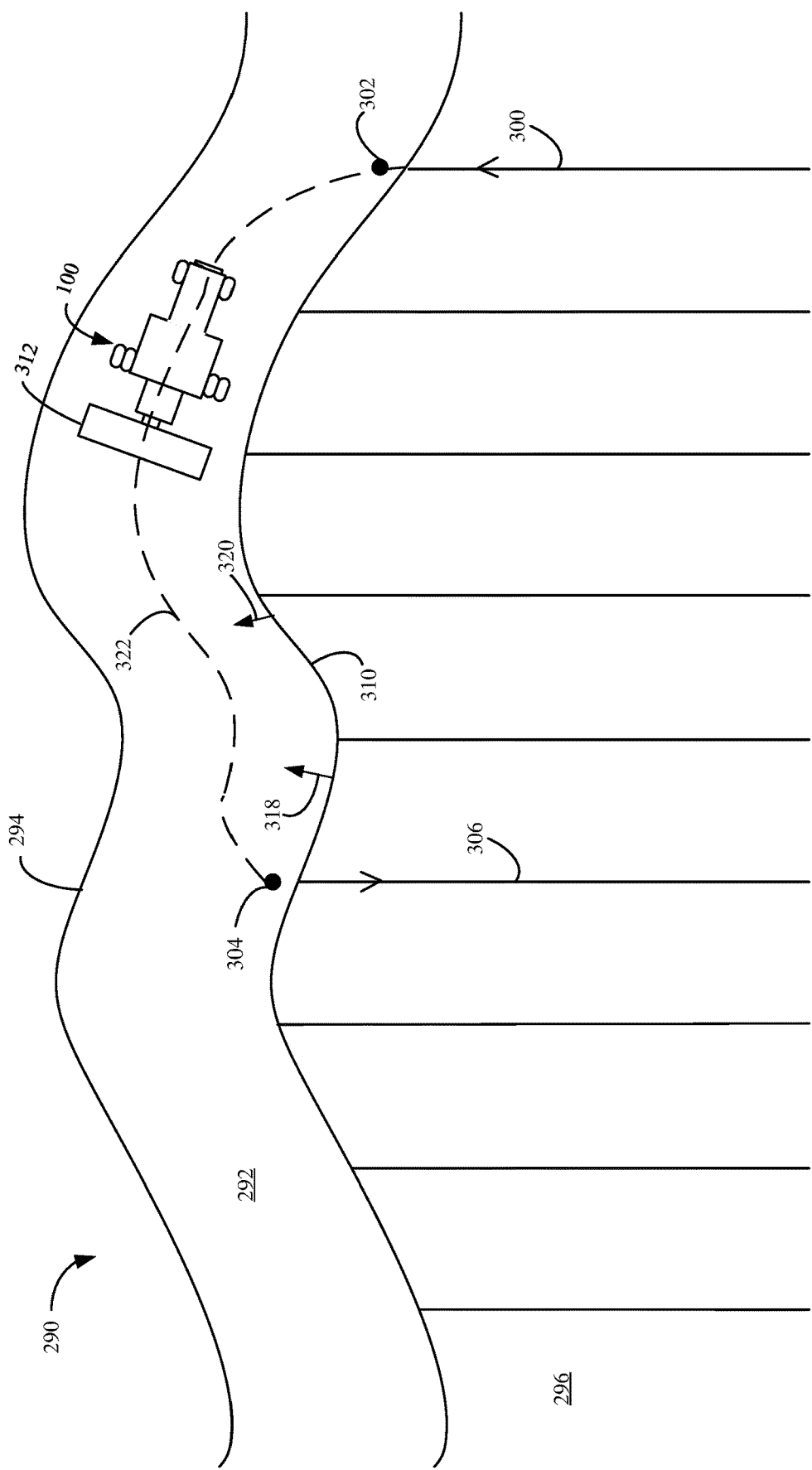
FIG. 3 is a pictorial illustration of a harvester making a headland turn.

Thus, the present description describes a system that automatically copies the contour of the boundary 310 between the headland 292 and standing crop region 296 of field 290 and projects that contour into the headland area 292, and uses that projected contour to generate the headland turn so that harvester 100 does not cross either the peripheral boundary 294 of field or the standing crop boundary 310. FIG. 3 shows one example. FIG. 3 is similar to FIGS. 2, and similar items are similarly numbered. However, in FIG. 3, instead of the headland turn being generated using a straight path (such as 314 shown in FIG. 2) the present system identifies the contour of boundary 310 and projects that contour into the headland area 292 in the direction indicated by arrows 318 and 320 and then connects the projected contour 322 to the endpoint 302 of the previous pass 300 and the start point 304 of the next pass 306 with transition sections. This path 322, connected to endpoint 302 and start point 304, is the path that defines the headland turn for harvester 100. In this way, harvester 100 will generally follow the contour of boundary 310 to make the headland turn and thus remain fully within the headland portion 292 of field 290, without crossing boundaries 310 or 294.

Figure 4:
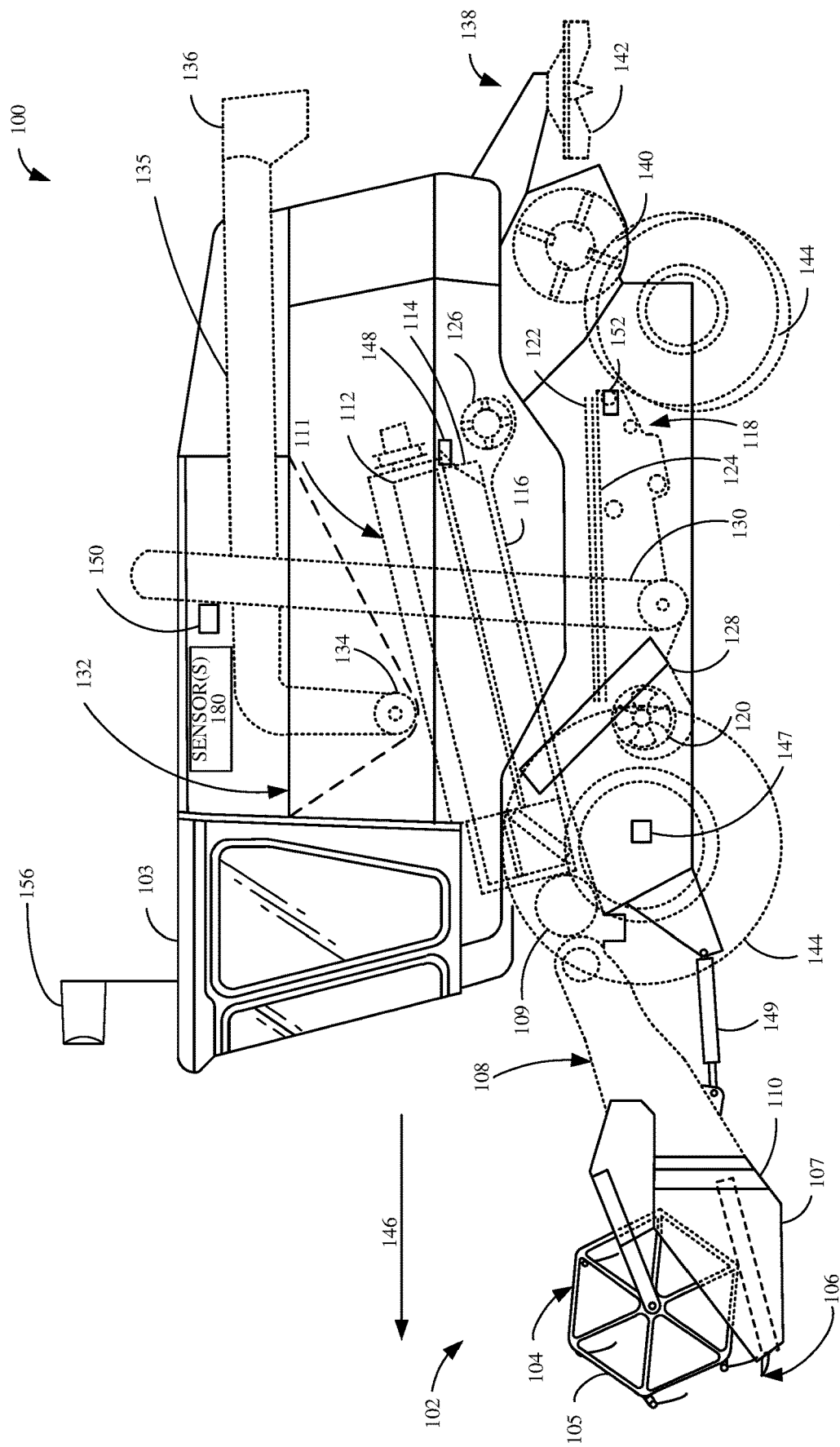
FIG. 4 is a partial pictorial, partial schematic illustration of one example of an agricultural harvester.

FIG. 4 is a partial pictorial, partial schematic, illustration of a mobile agricultural machine 100, in an example where mobile machine 100 is an agricultural harvester (also referred to as mobile agricultural machine 100 or harvester 100). It can be seen in FIG. 4 that mobile agricultural machine 100 illustratively includes an operator compartment 103, which can have a variety of different operator interface mechanisms for controlling agricultural harvester 100. Operator compartment 103 can include one or more operator interface mechanisms that allow an operator to control and manipulate agricultural harvester 100. The operator interface mechanisms in operator compartment 103 can be any of a wide variety of different types of mechanisms. For instance, the mechanisms can include one or more input mechanisms such as steering wheels, levers, joysticks, buttons, pedals, switches, etc. In addition, operator compartment 103 may include one or more operator interface display devices, such as monitors, or mobile devices that are supported within operator compartment 103. In that case, the operator interface mechanisms can also include one or more user actuatable elements displayed on the display devices, such as icons, links, buttons, etc. The operator interface mechanisms can include one or more microphones where speech recognition is provided on agricultural harvester 100. The operator interface mechanisms can also include one or more audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc., and other input mechanisms as well.

Agricultural harvester 100 includes a set of front-end machines forming a cutting platform 102 that includes a header 104 having a cutter generally indicated at 106. Harvester 100 can also include a feeder house 108, a feed accelerator 109, and a thresher generally indicated at 111. Thresher 111 illustratively includes a threshing rotor 112 and a set of concaves 114. Further, agricultural harvester 100 can include a separator 116 that includes a separator rotor. Agricultural harvester 100 can include a cleaning subsystem (or cleaning shoe) 118 that, itself, can include a cleaning fan 120, a chaffer 122 and a sieve 124. The material handling subsystem in agricultural harvester 100 can include (in addition to a feeder house 108 and feed accelerator 109) discharge beater 126, tailings elevator 128, and clean grain elevator 130 (that moves clean grain into clean grain tank 132). Agricultural harvester 100 also includes a material transport subsystem that includes unloading auger 134, chute 135, spout 136, and can include one or more actuators that actuate movement of chute 135 or spout 136, or both, such that spout 136 can be positioned over an area in which grain is to be deposited. In operation, auger 134 causes grain from grain tank 132 to be conveyed through chute 135 and out of spout 136. Agricultural harvester 100 can further include a residue subsystem 138 that can include chopper 140 and spreader 142. Agricultural harvester 100 can also have a propulsion subsystem that includes an engine (or other power source) that drives ground engaging elements 144 (such as wheels, tracks, etc.). It will be noted that agricultural harvester 100 can also have more than one of any of the subsystems mentioned above (such as left and right cleaning shoes, separators, etc.).

As shown in FIG. 4, header 104 has a main frame 107 and an attachment frame 110. Header 104 is attached to feeder house 108 by an attachment mechanism on attachment frame that cooperates with an attachment mechanism on feeder house 108. Main frame 107 supports cutter 106 and reel 105 and is movable relative to attachment frame 110, such as by an actuator (not shown). Additionally, attachment frame 110 is movable, by operation of actuator 149, to controllably adjust the position of cutting platform 102 relative to the surface (e.g., field) over which agricultural harvester 100 travels in the direction indicated by arrow 146, and thus controllably adjust a position of header 104 relative to the surface. In one example, main frame 107 and attachment frame 110 can be raised and lowered together to set a height of cutter 106 above the surface over which agricultural harvester 100 is traveling. In another example, main frame 107 can be tilted relative to attachment frame 110 to adjust a tilt angle with which cutter 106 engages the crop on the surface. Also, in one example, main frame 107 can be rotated or otherwise moveable relative to attachment frame 110 to improve ground following performance. In this way, the roll, pitch, and/or yaw of the header relative to the agricultural surface can be controllably adjusted. The movement of main frame 107 together with attachment frame 110 can be driven by actuators (such as hydraulic, pneumatic, mechanical, electromechanical, or electrical actuators, as well as various other actuators) based on operator inputs or automated inputs.

In operation, and by way of overview, the height of header 104 is set and agricultural harvester 100 illustratively moves over a field in the direction indicated by arrow 146. As harvester 100 moves, header 104 engages the crop to be harvested and gathers the crop towards cutter 106. After it is cut, the crop can be engaged by reel 105 that moves the crop to a feeding system. The feeding system moves the crop to the center of header 104 and then through a center feeding system in feeder house 108 toward feed accelerator 109, which accelerates the crop into thresher 111. The crop is then threshed by rotor 112 rotating the crop against concaves 114. The threshed crop is moved by a separator rotor in separator 116 where some of the residue is moved by discharge beater 126 toward a residue subsystem. The residue can be chopped by a residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits the clean grain in clean grain tank 132. Residue can be removed from the cleaning shoe 118 by airflow generated by cleaning fan 120. That residue can also be moved rearwardly in harvester 100 toward the residue handling subsystem 138.

Tailings can be moved by tailings elevator 128 back to thresher 110 where the tailings can be re-threshed. Alternatively, the tailings can also be passed to a separate re-threshing mechanism (also using a tailings elevator or another transport mechanism) where the tailings can be re-threshed as well.

FIG. 4 also shows that, in one example, agricultural harvester 100 can include a variety of sensors, some of which are illustratively shown. For example, harvester 100 can include ground speed sensors 147, one or more separator loss sensors 148, a fill level sensor 150, one or more cleaning shoe loss sensors 152, one or more perception systems 156 (e.g., forward-looking systems, such as a camera, lidar, radar, etc., an imaging system such as a camera, as well as various other perception systems), and one or more material spill sensors 180. Ground speed sensor 147 illustratively senses the travel speed of harvester 100 over the ground. Sensing ground speed can be done by sensing the speed of rotation of ground engaging elements 144, the drive shaft, the axle, or various other components. The travel speed can also be sensed by a positioning system, such as a global positioning system (GPS), a cellular triangulation system, a dead-reckoning system, or a wide variety of other systems or sensors that provide an indication of travel speed. Perception system 156 is mounted to and illustratively senses the field (and characteristics thereof) in front of and/or around (e.g., to the sides, behind, etc.) agricultural harvester 100 (relative to direction of travel 146) and generates sensor signal(s) (e.g., an image) indicative of those characteristics. For example, perception system 156 can generate a sensor signal indicative of agricultural characteristics in the field ahead of and/or around agricultural harvester 100. While shown in a specific location in FIG. 4, it will be noted that perception system 156 can be mounted to various locations on agricultural harvester 100 and is not limited to the depiction shown in FIG. 4. Additionally, while only one perception system 156 is illustrated, it will be noted that agricultural harvester 100 can include any number of perception systems 156, mounted to any number of locations within agricultural harvester 100, and configured to view any number of directions around agricultural harvester 100.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise a single sensor as well, instead of separate sensors for each shoe.

Separator loss sensors 148 provide signals indicative of grain loss in the left and right separators. The sensors associated with the left and right separators can provide separate grain loss signals or a combined or aggregate signal. Sensing loss can be done using a wide variety of different types of sensors as well. It will be noted that separator loss sensors 148 may also comprise a single sensor, instead of separate left and right sensors.

Fill level sensor 150 illustratively provides an output indicative of the fill level of the material receptacle or grain tank 132. Fill level sensor 150 can be any of a number of different types of sensors, such as an imaging system, an electromagnetic radiation sensor, a contact sensor, as well as various other types of sensors. Additionally, while only one fill level sensor 150 is shown, in other examples agricultural harvester 100 can include more than one fill level sensor including multiple different fill level sensors 150 disposed at multiple different locations.

It will be appreciated that agricultural harvester 100 can include a variety of other sensors not illustratively shown in FIG. 4. For instance, agricultural harvester 100 can include residue setting sensors that are configured to sense whether agricultural harvester 100 is configured to chop the residue, drop a windrow, etc. The sensors can include cleaning shoe fan speed sensors that can be configured proximate fan 120 to sense the speed of the fan. They can include threshing clearance sensors that sense clearance between the rotor 112 and concaves 114. They can include threshing rotor speed sensors that sense a rotor speed of rotor 112. They can include chaffer clearance sensors that sense the size of openings in chaffer 122. They can include sieve clearance sensors that sense the size of openings in sieve 124. The sensors can include material other than grain (MOG) moisture sensors that can be configured to sense the moisture level of the material other than grain that is passing through agricultural harvester 100. The sensors can include machine settings sensors that are configured to sense the various configured settings on agricultural harvester 100. The sensors can also include machine orientation sensors that can be any of a wide variety of different types of sensors that sense the orientation of agricultural harvester 100, and/or components thereof. The sensors can include crop property sensors that can sense a variety of different types of crop properties, such as crop type, crop moisture, and other crop properties. The crop property sensors can also be configured to sense characteristics of the crop as they are being processed by agricultural harvester 100. For instance, the crop property sensors can sense grain feed rate, as it travels through clean grain elevator 130. The crop property sensors can sense mass flow rate of grain through elevator 130 or provide other output signals indicative of other sensed variables. Agricultural harvester 100 can include soil property sensors that can sense a variety of different types of soil properties, including, but not limited to, soil type, soil compaction, soil moisture, soil structure, among others.

Some additional examples of the types of sensors that can be used are described below, including, but not limited to a variety of position sensors that can generate sensor signals indicative of a position (e.g., geographic location, orientation, elevation, etc.) of agricultural harvester 100 on the field over which agricultural harvester 100 travels or a position of various components of agricultural harvester 100 (e.g., header 104) relative to, for example, the field over which agricultural harvester 100 travels.

Figure 5:
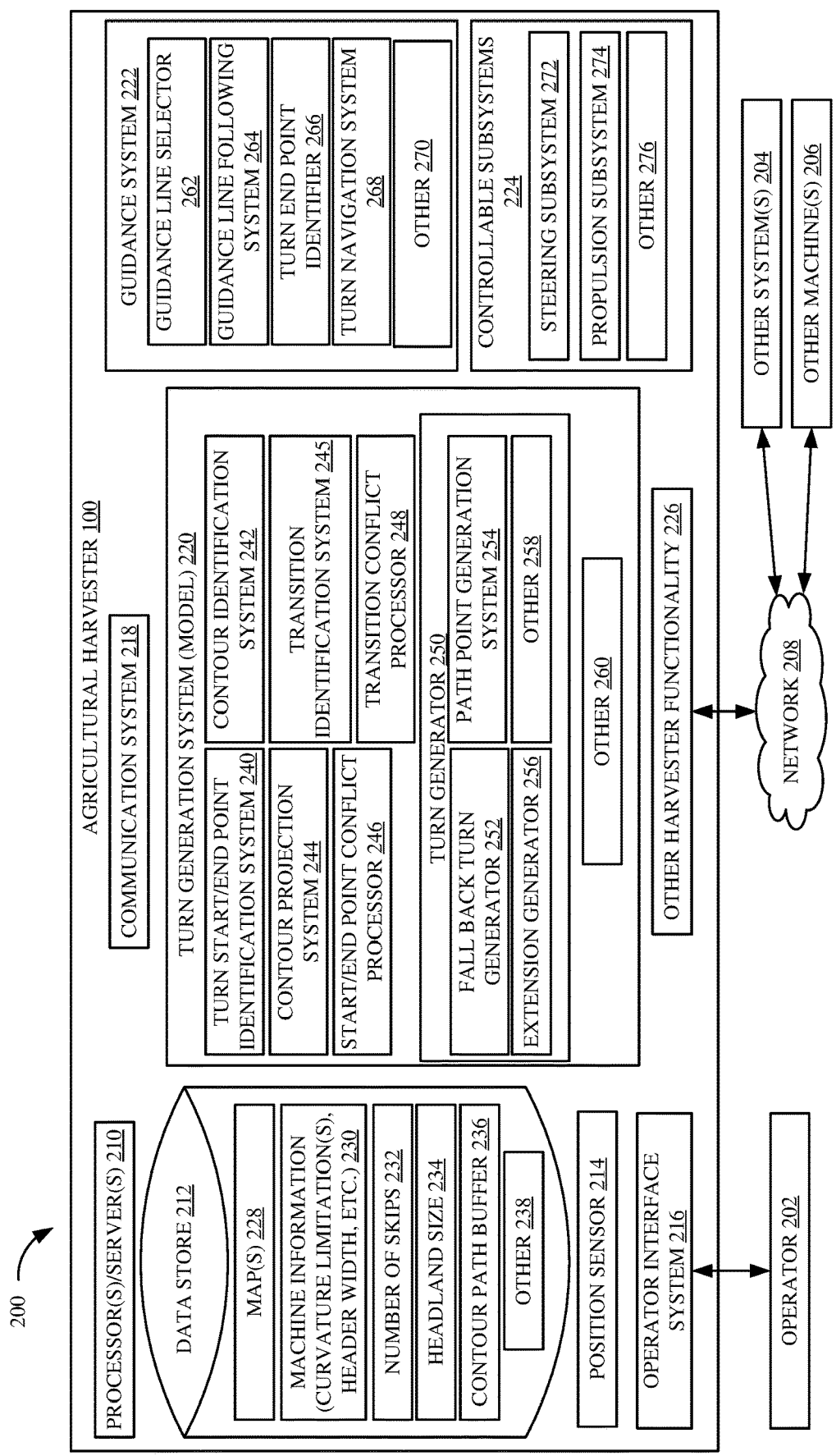
FIG. 5 is a block diagram showing one example of an agricultural system.

FIG. 5 is a block diagram of one example of an agricultural system 200. Agricultural system 200 shows that agricultural harvester 100 may be operated by an operator 202. In the example shown in FIG. 5, harvester 100 may also be connected to other systems 204 and other machines 206 over network 208. Other systems 204 can include remote server systems, farm manager systems, vendor or manufacturer systems, among others. Other machines 206 can include other harvesters, tender vehicles, etc. Network 208 can be a wide area network, a local area network, a near field communication network, a Wi-Fi or Bluetooth network, a cellular communication network, or any of a variety of other networks or combinations of networks.

Agricultural harvester 100 includes one or more processors or servers 210, data store 212, one or more position sensors 214, operator interface system 216, communication system 218, turn generation system (or model) 220, guidance system 222, one or more controllable subsystems 224, and any of a wide variety of other harvester functionality 226. Data store 212 can include maps 228, machine information (such as limits on how sharply the harvester can turn, the header width of the harvester, and other machine limitation and dimension information) 230, a number of skips 232 that is to be used when harvesting, a headland size 234, a contour path buffer size 236, and other information 238. It will be noted that, as discussed elsewhere herein, some of the information 228-238 may be entered by operator 202 or downloaded from another system 204 or another machine 206 or sensed by sensors or obtained or derived in other ways.

Turn generation system 220 can include turn start/end point identification system 240, contour identification system 242, contour projection system 244, transition identification system 245, start/end point conflict processor 246, transition conflict processor 248, turn generator 250 (which, itself, can include fallback turn generator 252, path point generation system 254, extension generator 256, and other items 258), as well as other items 260.

Guidance system 222 can include guidance line selector 262, guidance line following system 264, turn end point identifier 266, turn navigation system 268, and other functionality 270. Controllable subsystems 224 can include steering subsystem 272, propulsion subsystem 274, and any of a wide variety of other subsystems 276. Before describing the overall operation of agricultural harvester 100 in more detail, a description of some of the items in harvester 100, and their operation, will first be provided.

Communication system 218 allows communication of the items of harvester 100 with one another, and also facilitates communication over network 208. Therefore, communication system 218 may be a controller area network (CAN) bus and bus controller, and may include a wide area network communication system, a local area network communication system, a near field communication system, a Wi-Fi or Bluetooth communication system, a cellular communication system, or any of a wide variety of other communication systems or combinations of systems.

Maps 228 may be maps of the field in which agricultural harvester 100 operates. The maps may define the boundaries of the field, and may also include routes along which harvester 100 navigates in order to harvest the field. The maps may include any of a wide variety of other information as well. Machine information 230 may include dimensional or other information about harvester 100. The dimensional information may include, for instance, the width of the header on harvester 100, and other information. Machine information 230 may also indicate the limitations on how sharply harvester 100 can turn, the rate at which the turning radius of harvester 100 may be manipulated, and other information. The number of skips 232 may be the number of rows or passes that harvester 100 skips when making a headland turn during a harvesting operation. For instance, in order to effectively make a headland turn, harvester 100 may skip a number of passes or guidance lines when performing a harvesting operation. The number of skips may be a predefined number, or a number that varies dynamically. The number of skips 232 may be input by operator 202 or downloaded from another system 204 or another machine 206 or received in other ways.

The headland size 234 may indicate the number of passes that harvester 100 makes in harvesting the headland portion of the field, the measurement of the headland portion, or another size indicator. The headland size 234 may be automatically computed by using position sensor 214 to sense the number of passes that harvester 100 makes during the harvesting operation, along with dimensions of harvester 100. The headland size 234 may be generated from historical harvesting or planting data, or the headland size may be input by operator 202, or obtained in other ways.

Contour path buffer 236 is a value which indicates, when harvester 100 is making a headland turn, how far harvester 100 should stay away from the boundary 310 while traversing the headlands during the turn. In one example, the contour path buffer size 236 is equal to half of the width of the header on harvester 100 so that, when making a headland turn, the header will not come into contact with any standing crop in the field. Again, the contour buffer 236 may be input by operator 202, automatically calculated or downloaded for use by harvester 100, may be a default value or a predetermined value, or another value.

Position sensor 214 may be a global navigation satellite system (GNSS) receiver, a dead reckoning system, a cellular triangulation system, or any of a wide variety of other sensors or sensing systems that provide an indication of the position of agricultural harvester 100 on a global or local coordinate system. Sensor 214 may also provide an output indicative of the heading, pose, route, or other position information corresponding to harvester 100. Thus, sensor 214 can include accelerometers, inertial measurement units, gyroscopic sensors, a compass, a speedometer, or other sensors that may be used in generating an input indicative of the position, heading, speed, pose, and/or other position information corresponding to harvester 100.

Operator interface system 216 includes mechanisms that allow operator 202 to control and manipulate harvester 100. Thus, system 216 can include levers, joysticks, a steering wheel, pedals, knobs, buttons, switches, linkages, a display screen, a microphone and speaker (where speech recognition and speech synthesis are provided), a touch screen (where touch gestures can be detected), user actuatable display elements such as icons, links, buttons, or other mechanisms that can be actuated by the operator 202. Operator interface system 216 can include any of a wide variety of other mechanisms that can be used to generate and receive audio, visual, and/haptic outputs and/or inputs.

Turn generation system 220 receives information indicative of a current guidance line that harvester 100 is following on a current pass through the field and an end point for that pass, as well as a start point for the next pass that harvester 100 will make through the field, after making a headland turn. Turn generation system 220 then projects the contour of the field boundary into the headlands and attempts to generate transitions that connect the end point of the current pass and the start point of the next pass to the projected contour. Therefore, turn start/end point identification system 240 identifies the end points where the headland turn starts and ends and contour identification system 242 identifies the contour of the boundary 310 of the headlands (which may derived from the outer boundary 294 or periphery of the field along the headlands 292, or from the inner boundary 310 between the headlands and where standing crop is still present). Contour projection system 244 projects the contour into a central portion of the headlands so that harvester 100 can follow that contour, while making a headland turn between the turn start point and the turn end point, and still remain fully within the headlands 292. Start/end point conflict processor 246 determines whether harvester 100 is capable of making turns sufficiently quickly to navigate the projected contour where that contour is currently projected. If not, this is deemed a conflict (as described in greater detail below) and the contour projection is moved to a different position within the headlands. Transition conflict processor 248 determines whether the transitions are in conflict with one another (again, as described in greater detail below) If so, the system generates a default turn (such as a keyhole turn).

When the projection is placed at a location within the headlands 292 where there are no conflicts. then turn generator 250 generates the turn as a set of points that define a path that harvester 100 can follow to navigate the turn. Fallback turn generator 252 identifies a fallback turn contour (such as a keyhole turn) where the contour of the boundary cannot successfully be followed without a conflict. Path point generation system 254 generates points along a path to define the turn and extension generator 256 generates extensions to the turn that can be used to connect the turn to transitions that are calculated from a current pass and to the next subsequent pass.

Guidance system 222 guides navigation of harvester 100 to follow the path defined by the points. Guidance line selector 262 selects a guidance line to follow in performing a pass through the field. Guidance line following system 264 controls the steering subsystem 272 of harvester 100 so that harvester 100 follows the selected guidance line to make a pass. Turn end point identifier 266 identifies the start and end points where harvester 100 is free to begin a turn form a current pass to make a headland turn (the turn start point) and where harvester 100 must be located when it completes the headland turn (turn end point) to begin the next subsequent pass. Turn navigation system 268 navigates harvester 100 so harvester 100 follows the path defined for the headland turn by turn generator 250.

Steering subsystem 272 includes functionality that can be used to steer harvester 100. Propulsion subsystem 274 includes things such as an engine or motors, along with any transmissions that are needed to propel harvester 100.

Figure 6A:
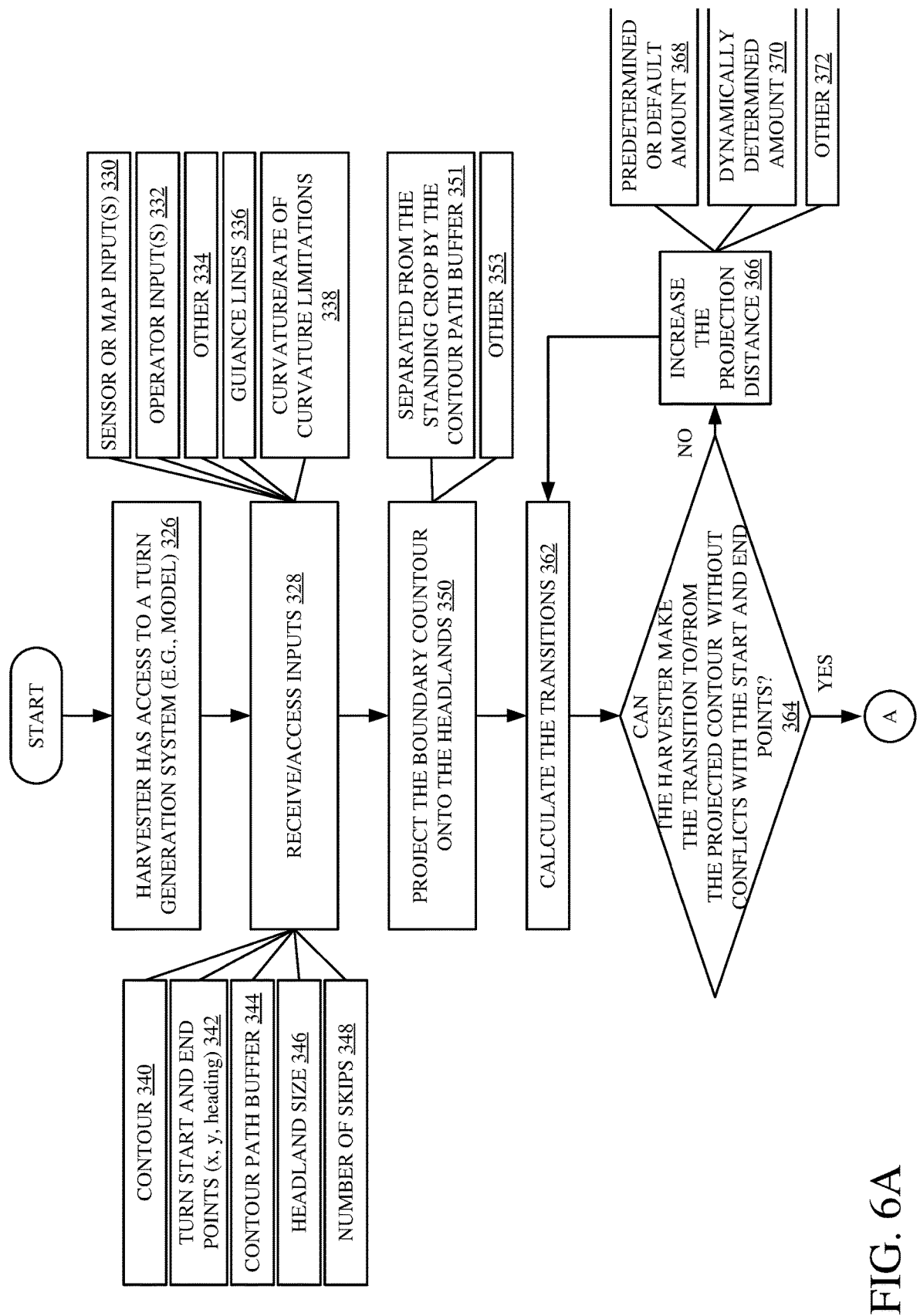
FIGS. 6A and 6B (collectively referred to herein as FIG. 6) show a flow diagram illustrating one example of the operation of a turn generation system.
Figure 6B:
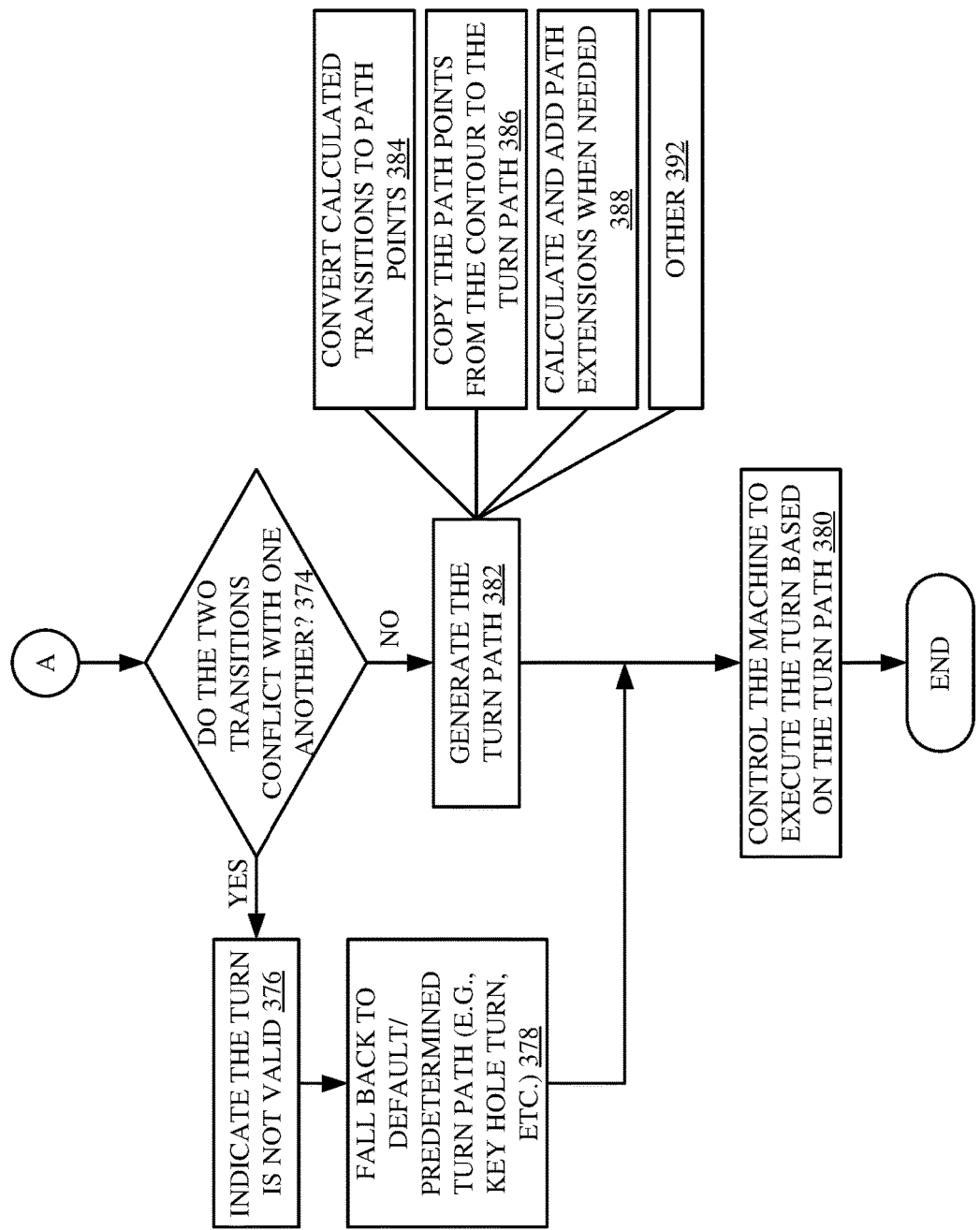

FIGS. 6A and 6B (collectively referred to herein as FIG. 6) show a flow diagram illustrating one example of the operation of harvester 100 in making a headland turn. It is first assumed that harvester 100 has access to a turn generation system 220, as indicated by block 326 in the flow diagram of FIG. 6. In one example, turn generation system 220 is on a control system or other automation system on harvester 100. In another example, turn generation system 220 may be on a remote server or other system 204, or on a different machine 206. In those examples, communication system 218 communicates with the other systems 204 or machines 206 to access turn generation system 220. These are just examples of how harvester 100 can have access to turn generation system 220.

Turn generation system 220 then receives or otherwise accesses inputs that are used to generate the headland turn. Receiving or accessing the inputs is indicated by block 328 in the flow diagram of FIG. 6. The inputs may be sensor inputs or map inputs from any of a wide variety of sensors or sources of maps 228. Receiving sensor or map inputs is indicated by block 330 in the flow diagram of FIG. 6. The inputs may be operator inputs 332, or the inputs may be received in a wide variety of other ways 334.

In one example, the inputs include an indication of the guidance lines 336 that define the current pass that harvester 100 is making through the field as well as the next subsequent pass. The inputs can include limitations on how sharply harvester 100 can turn and the rate at which the turning radius of harvester 100 can be changed. Receiving inputs indicating limitations on the curvature and rate of curvature of steering machine 100 is indicated by block 338 in the flow diagram of FIG. 6. The inputs also illustratively include the contour (e.g., curvature) of boundary 310, as indicated by block 340 in the flow diagram of FIG. 6. The contour of boundary 310 may be identified by contour identification system 242 as a set of coordinates identifying geographical points that are located along that boundary 310 and which define the boundary 310. The contour may be represented in other ways as well. Also, the contour may be received from a map 228 which shows the peripheral boundary 294 of field 290, in which case the boundary 310 will generally follow the contour of boundary 294. In another example, the contour 310 may be sensed as harvester 100 harvests the end rows in headland area 292 of field 290. The position sensor 214 may generate a set of points that define contour 310, as harvester 100 harvests the headland area 292.

Also, the inputs to turn generation system 220 may be the turn start point 302 and the turn end point 304 which also define the end of pass 300 and the beginning of pass 306, respectively. Those points may be obtained by turn start/end point identification system 240, by receiving information from guidance system 222. The start and end points may be received in other ways as well. Obtaining the turn start and end points will illustratively include obtaining a set of coordinates corresponding to each of those points as well as a harvester heading for harvester 100 when harvester 100 reaches those points. Obtaining the turn start and end points as a set of coordinates and a heading is indicated by block 342 in the flow diagram of FIG. 6.

The inputs to turn generation system 220 may also include a contour path buffer value 344. The contour path buffer value defines a minimum distance that contour 322 (referring to FIG. 3) should be projected away from boundary 310 (e.g., in the direction generally indicated by arrows 318 and 320) so that, as harvester 100 travels along the path 322, it will not cross boundary 310. The contour path buffer 344 may be initially set to half of the width of the header of harvester 312, or to a different size. The inputs to turn generation system 222 may also include the size of headland 292 (e.g., in terms of the number of passes that harvester 100 makes to harvest headland area 292, or defined in other ways). The headland size is indicated by block 346 in the flow diagram of FIG. 6. The input to turn generation system 200 may also include the number of skips that harvester 100 is to make between passes. For instance, in FIG. 3, pass 300 is separated from the subsequent pass 306 by four guidance lines indicating that harvester 100 will skip four guidance lines between passes. Receiving the number of skips is indicated by block 348 in the flow diagram of FIG. 6.

Figure 7:
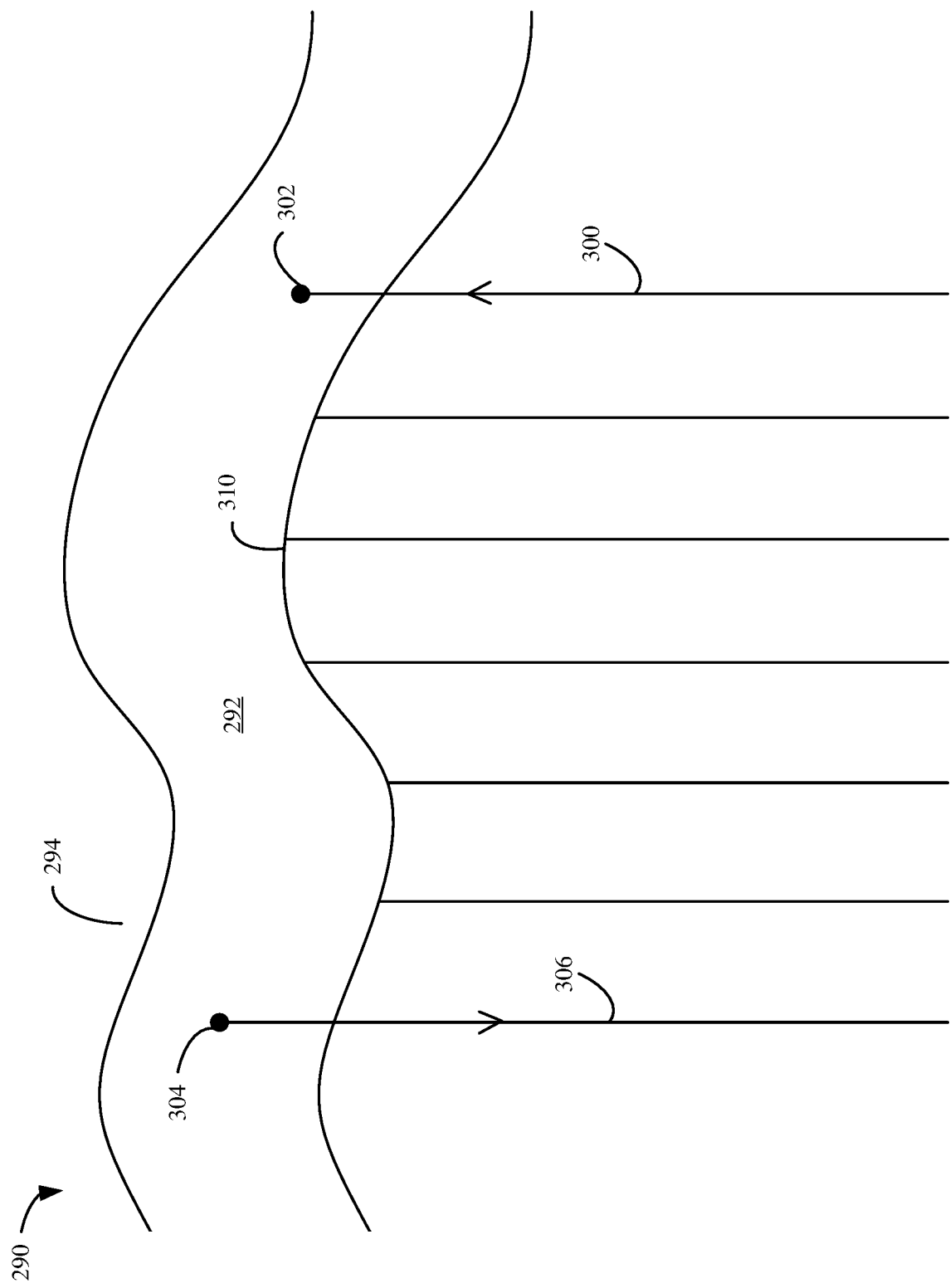
FIGS. 7, 8, 9, 10, 11, and 12 show examples of turn paths that can be generated by a turn generation system.
Figure 8:
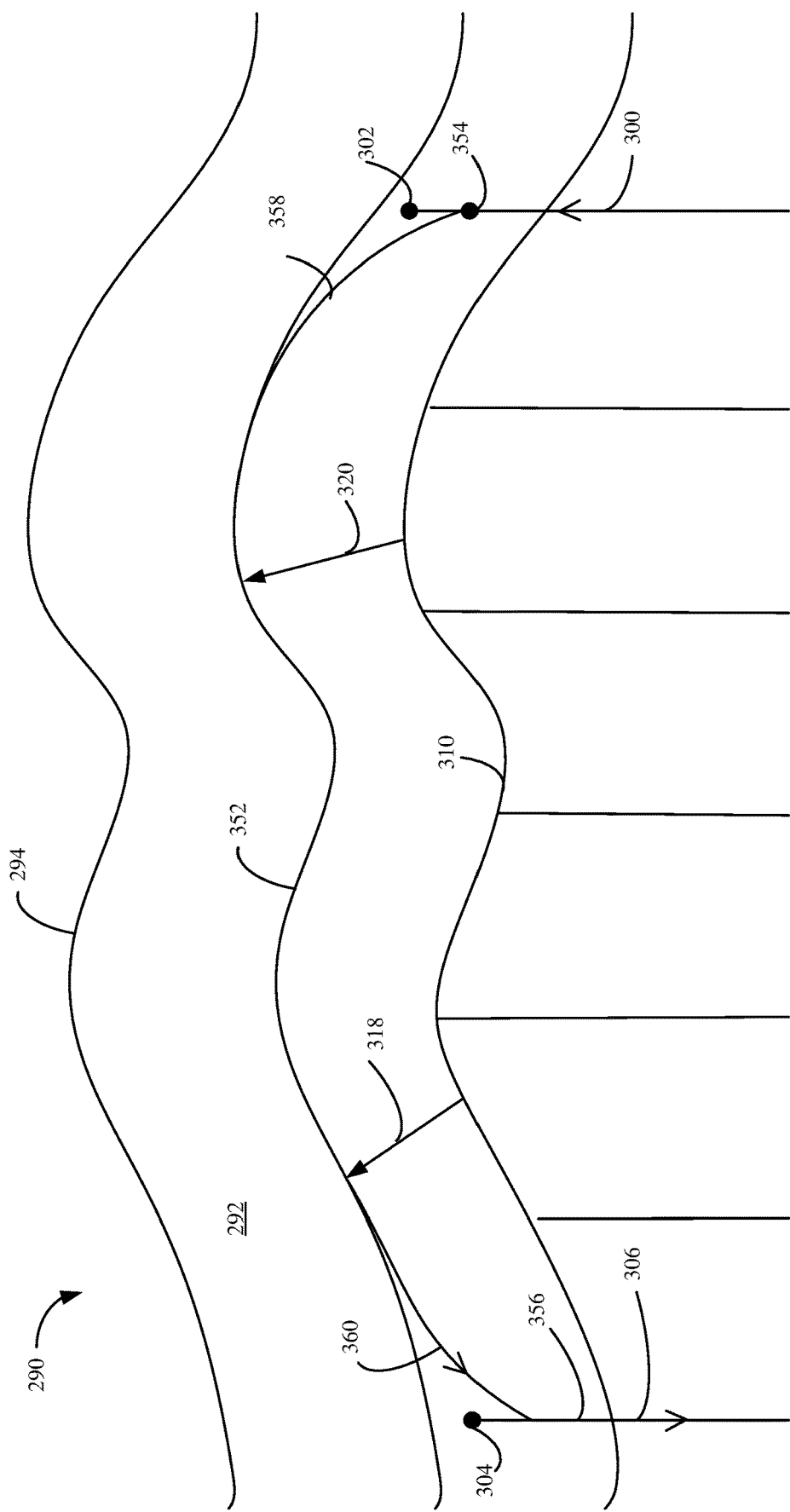

Contour projection system 244 then projects the boundary contour (of boundary 310) onto the headland portion 292 of field 290, as indicated by block 350 in the flow diagram of FIG. 6. FIG. 7, for instance, shows one example of a boundary 310 that has a particular contour. The current pass 300 also has an end point illustrated at 302 (which is also the turn start point), and a turn end point 304 (which is also the start point for the subsequent pass 306). In FIG. 8, the contour of boundary 310, represented by 352, is projected into the headland area 292 of field 290 by a distance equal to the contour path buffer value 344. In the example illustrated in FIG. 8, the contour path buffer is set to one half of the working width of harvester 100 (e.g., half the width of header 312). Spacing the contour 352 from the boundary 310 by a distance equal to the contour path buffer value is indicated by block 351 in the flow diagram of FIG. 6. The projection of the boundary contour into the headlands can be done in other ways as well, as indicated by block 353.

Transition identification system 245 calculates the transitions 358 and 360. Transition 358 defines a route or path that harvester 100 can follow to transition from the current pass 304 to the projected contour 352. Transition 360 defines a route or path that harvester 100 can follow to transition from projected contour 352 to the next subsequent pass 306. The transitions can be calculated based on the limitations of harvester 100 in how sharply harvester 100 can turn and/or based on other criteria.

Transition identification system 245 also calculates the transition start point 354, and the transition end point 356. Transition start point 354 identifies the point at which harvester 100 will need to begin turning in order to follow the transition 358 between point 354 and the contour 352. Transition end point 356 defines the point where harvester 100 needs to transition to (after following transition 360 from contour 352) so that harvester 100 will be in a position to begin subsequent pass 306. Calculating the transition start point 354, the transition end point 356, and the transition routes 358 and 360, are indicated by block 362 in the flow diagram of FIG. 6.

Start/end point conflict processor 246 then determines whether the transition 358 from the current pass 304 to the projected contour 352 can be made without conflicting with the end point 302 of pass 304, and also whether the transition 360 from the projected contour 352 can be made to the subsequent pass 306 without conflicting with the start point 304 of the next pass 306. It can be seen FIG. 8 that the transition start point 354 is before the turn start point 302 (in the direction of travel of harvester 100), and similarly the transition end point 356 is after the turn end point 304 (in the direction of travel of harvester 100) so that both the start and end points of the turn defined by contour 352 and transitions 358 and 360 are invalid. The first conflict with respect to points 354 and 302 means that harvester 100 will not finish pass 300 (by reaching point 302) before it must begin the turn (at point 354). The second conflict between points 304 and 356 means that harvester 100 will not be able to be in a position to start pass 306 at the proper point 304 because harvester 100 will not have finished the headland turn by that point. Determining whether such conflicts exist between the transitions to and from the projected contour 352 and the start and end points 302 and 304 is indicated by block 364 in the flow diagram of FIG. 6.

If a conflict does exist, such as indicated in FIG. 8, then contour projection system increases the projection distance (increases the spacing of contour 352 from boundary 310 in 6 the direction indicated by arrows 318 and 320) to project the contour 352 further away from boundary 310 in headland area 292 of field 290. Increasing the projection distance is indicated by block 366 in the flow diagram of FIG. 6. The distance by which the projection is increased may be a predetermined or default distance 368, or a dynamically determined distance, as indicated by block 370. The amount by which the projection is increased into the headland area 292 of field 290 can be determined in other ways as well, as indicated by block 372.

Figure 9:
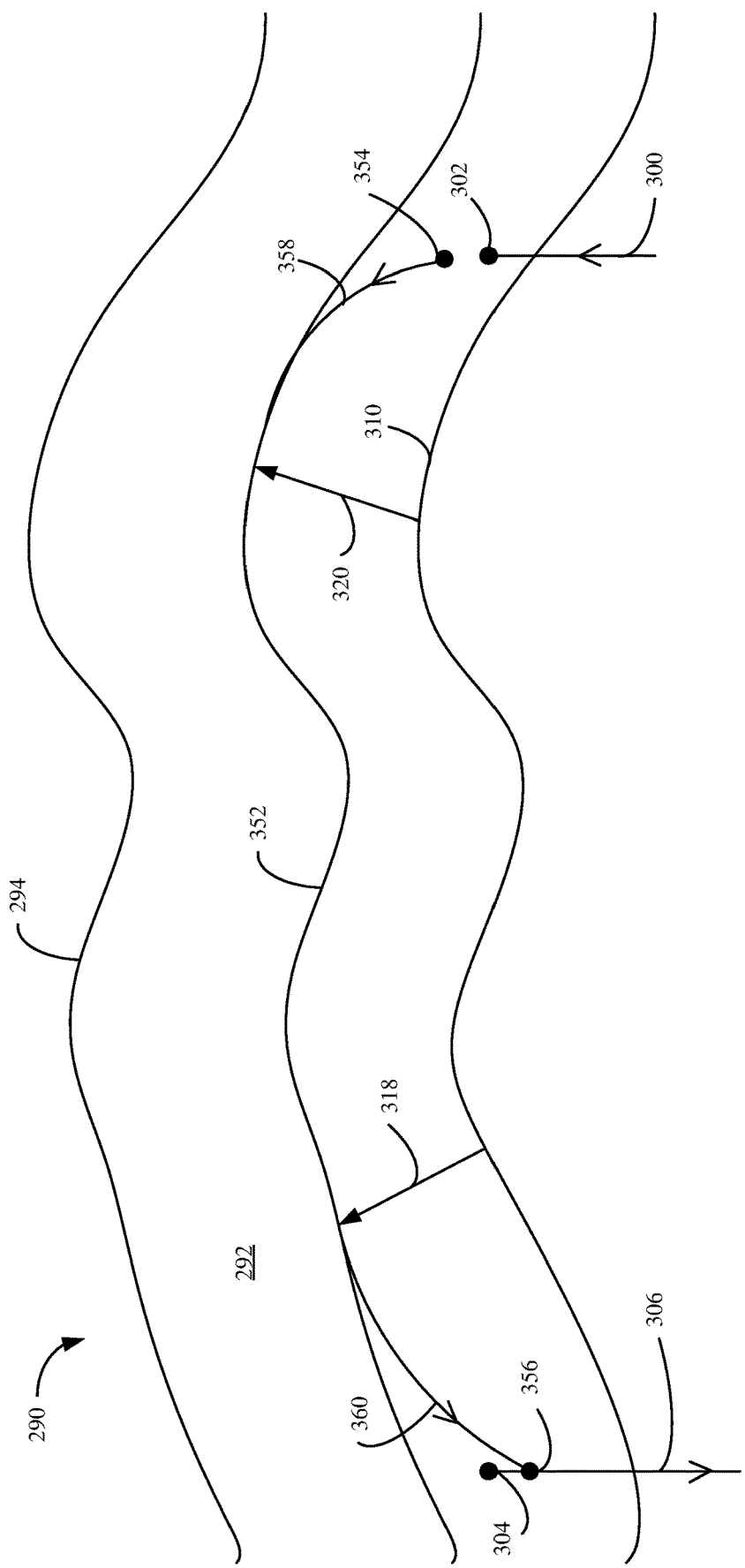

FIG. 9 shows an example in which the contour 352 has been projected further into headland area 292 along arrows 318 and 320, from the boundary 310. The transitions are again calculated at block 362 and the transition start and end points are also again identified as points 354 and 356, respectively. The start/end point conflict processor 246 again determines whether there is a conflict between the transition start point 354 and the turn start point 302, as well as whether there is a conflict between the transition end point 356 and the turn end point 304.

In FIG. 9, it can be seen that there is no conflict between the turn start point 302 and the transition start point 354 so that harvester 100 can navigate the transition from the current pass 304 to the contour 352 without needing to begin the transition prior to the end of pass 300. However, there is still a conflict between the turn end point 304 and the transition end point 356. It can be seen that the transition would not end at point 356 until after the turn end point 304 so that harvester 100 could not successfully navigate from contour 352 to the next pass 306, because it would miss the turn end point 304 (which also marks the start point of the next pass 306).

Figure 10:
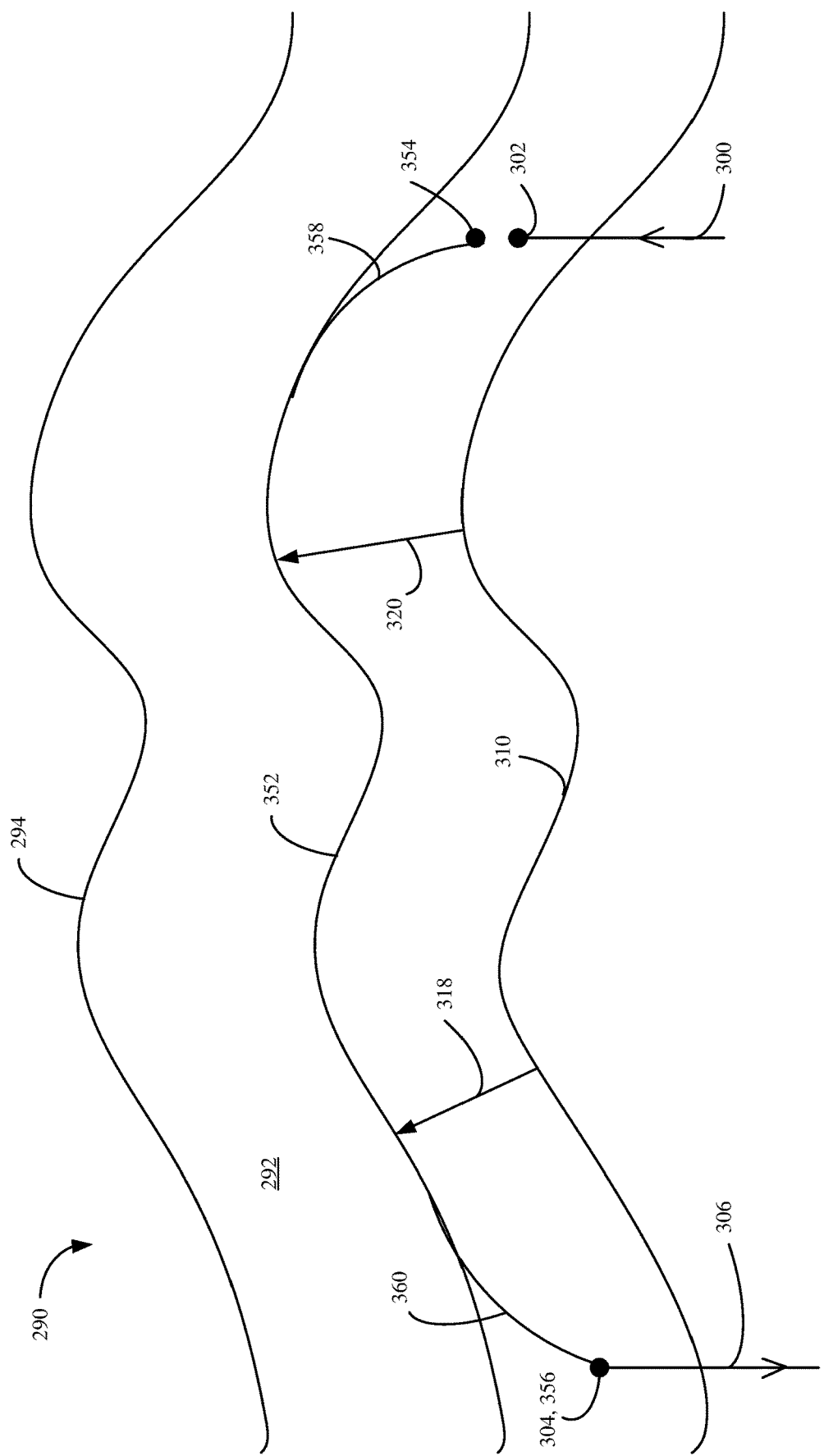

Thus, contour projection system 244 again projects the contour 352 further into the headland area 292 until both the start and end points of the transitions are free of conflict. FIG. 10 shows one example of this. It can now be seen that contour 352 has been projected even further into the headland area 292, away from boundary 310, generally along arrows 318 and 320. FIG. shows that contour 352 has been projected by a sufficient distance that both the turn end point 304 and the transition end point 356 coincide with one another. Thus, at block 364 start/end point conflict processor 206 does not identify a conflict.

Figure 11:
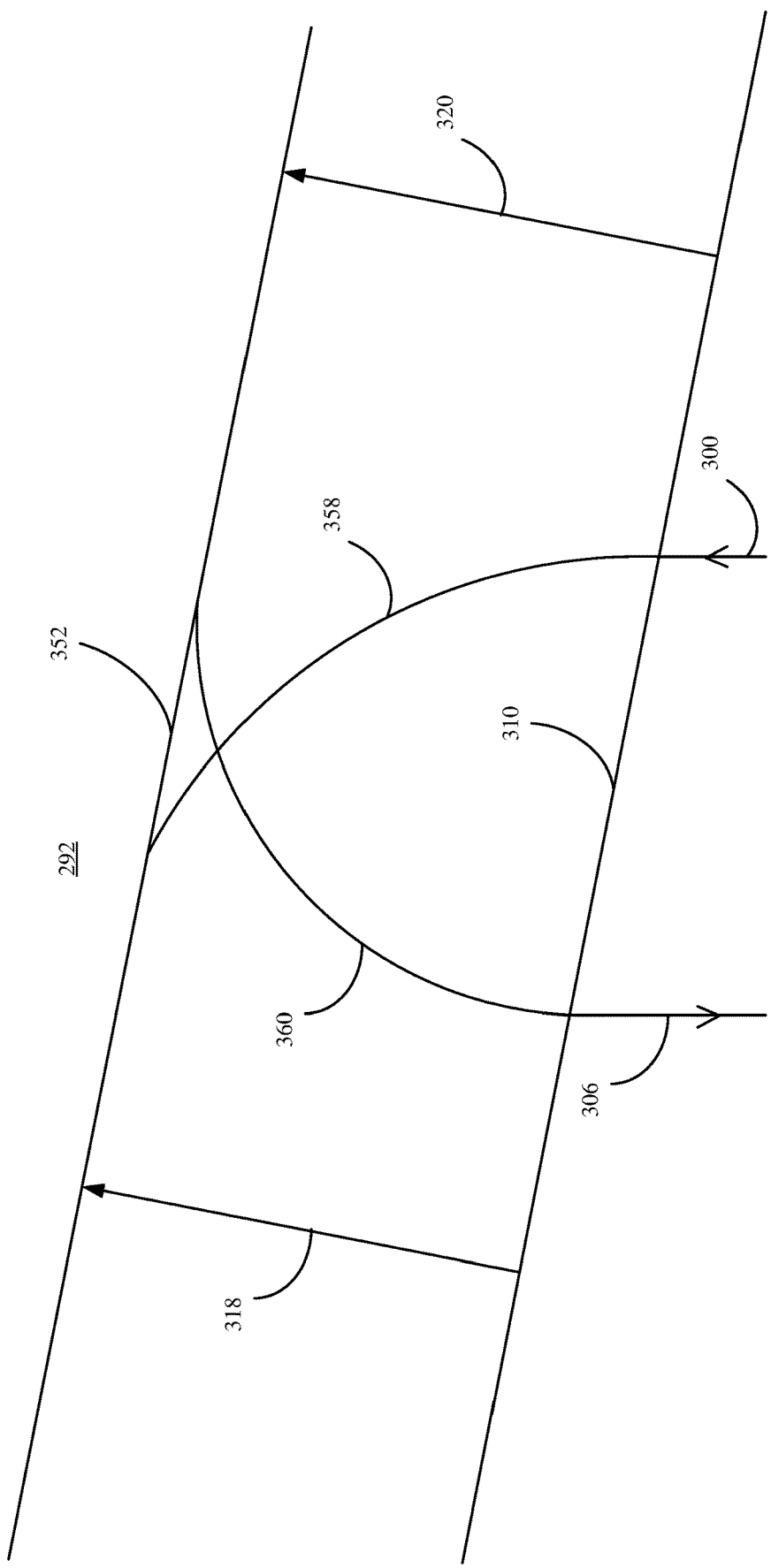

Transition conflict processor 248 then determines whether the transitions 358 and 360 conflict with one another. An example of where the transitions 358 and 360 conflict with one another is illustrated in FIG. 11. In the example shown in FIG. 11, the harvester 100 is unable to complete transition 358 before it needs to begin transition 360. This may happen, for instance, where the current pass 304 is too close to the next subsequent pass 306, so that harvester 100 is not able to turn sharply enough to begin following the projected contour 352 before it needs to begin making the transition 360 onto the next subsequent pass 306. Determining whether the transitions conflict with one another is indicated by block 374 in the flow diagram of FIG. 6.

If the two transitions do conflict with one another, then transition conflict processor 248 generates an output to turn generator 250 indicating that the automated turn is not valid, as indicated by block 376 in the flow diagram of FIG. 6. If that is the case, then fall back turn generator 252 falls back to a default or predetermined turn path (such as a keyhole turn path, or another default turn path) as indicated by block 378. Turn generator 250 generates an output indicative of the default turn path to guidance system 222 which uses turn navigation system 268 to navigate through the default turn path. Controlling the harvester 100 to execute the turn based upon the turn path output by turn generator 250 is indicated by block 380 in the flow diagram of FIG. 6.

Returning to block 374 in FIG. 6, assuming that the transitions 358 and 360 do not conflict with one another, then turn generator 250 generates the turn path corresponding to the projected contour 352 as well as the transitions 358 and 360. Generating the turn is indicated by block 382 in the flow diagram of FIG. 6. The generated turn is output to guidance system 222 in a form that turn navigation system 268 can use to control the steering subsystem 272 and/or propulsion subsystem 274 to navigate the turn output by turn generator 250. In one example, the projected contour and the calculated transitions 258 and 260 are converted to path points which are geographic locations that can be used for navigating along the projected contour and transitions by turn navigation system 268. Converting the calculated transitions to path points is indicated by block 384 in the flow diagram of FIG. 6. Path point generation system 254 copies the path points from the transitions 358 and 360 and from the projected contour to generate the turn path, as indicated by block 386. The path points for the turn will now define the geographic location of the projected contour 352 as well as the transitions 358 and 360.

It can be seen in FIG. 10 that extensions may also need to be added to the turn path to connect the transition start point 354 with the turn start point 302. In that case, extension generator 256 generates path points to extend the turn path between points 302 and 354, as indicated by block 388 in the flow diagram of FIG. 6.

Figure 12:
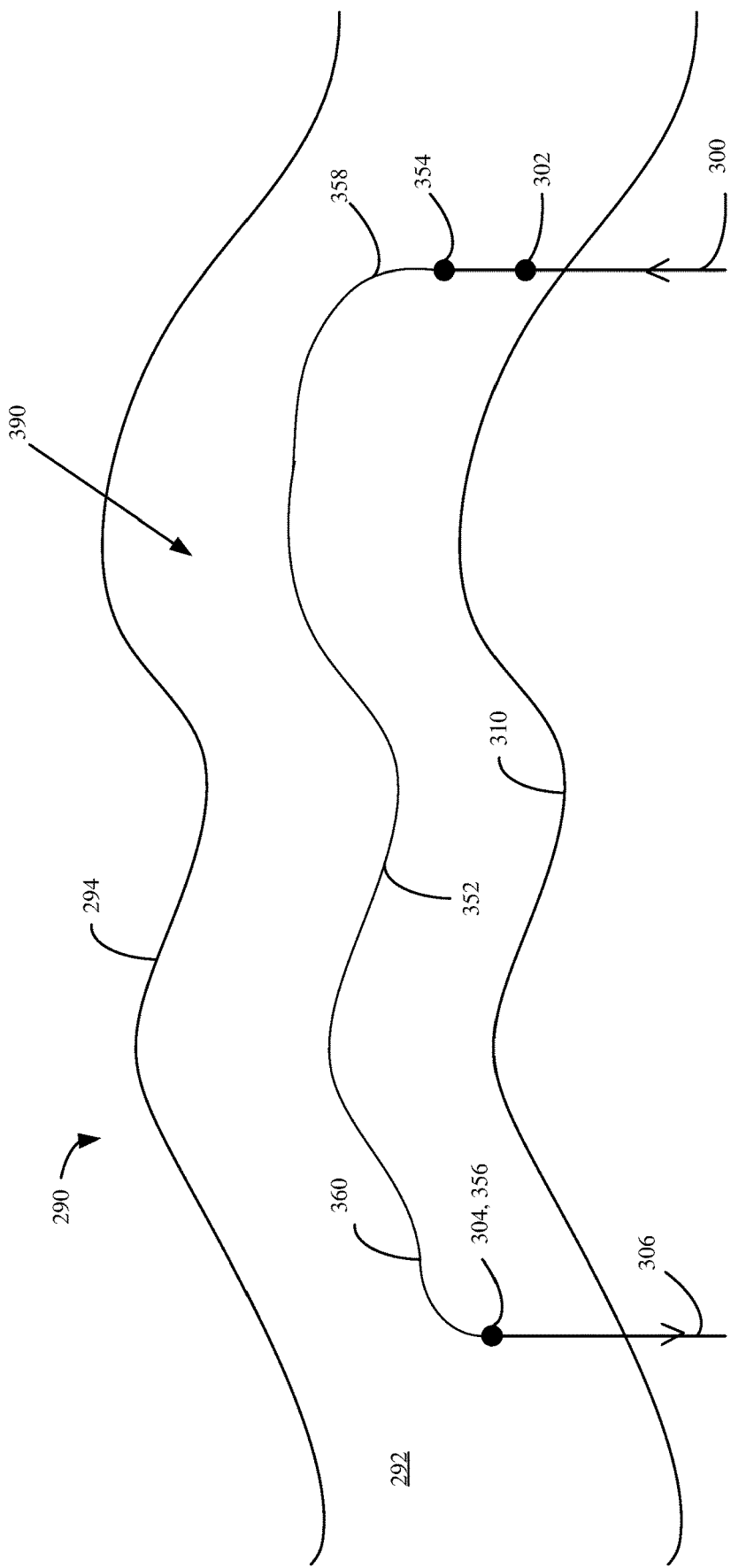

FIG. 12 shows the result of adding the extension to the turn path between points 302 and 354. It can now be seen that the turn path (overall represented by 390) includes path points (e.g., geographical points or points otherwise identified in a coordinate system that can be navigated by harvester 100) that extend from the turn start point 302 up to the transition start point 354, through the transition 358, along the projected contour 352, through transition 360, to the transition end point and turn end point (which in the example shown in FIG. 12 coincide with one another) 304, 356. The path points are provided to turn navigation system 268 so that turn navigation system 268 can generate control signals to control the steering subsystem 272 and/or propulsion subsystem 274 to navigate harvester 100 through the turn path 390 from a current pass 304 to a next subsequent pass 306 in Field 290. The turn can be generated in other ways as well, as indicated by block 392 in the flow diagram of FIG. 6.

It can thus be seen that the present discussion describes a system that automatically generates a turn path that follows the contour of the boundary of a headland portion of a field. This allows the harvester 100 to navigate that turn path without any part of the harvester 100 crossing the boundary of the headland portion of the field. Because the turn is automatically generated, the operator need not manually navigate the turn. This increases the efficiency of the harvesting operation and reduces operator fatigue and operator error. By automatically it is meant that the operation is performed without further human involvement except, perhaps, to authorize or initiate the operation.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted that the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, identifiers, selectors, and/or logic. It will be appreciated that such systems, components, generators, identifiers, selectors, and/ or logic can be comprised of hardware items (such as processors and associated memory, or other processing components, some of which are described below) that perform the functions associated with those systems, components, generators, identifiers, selectors, and/or logic. In addition, the systems, components, generators, identifiers, selectors, and/or logic can be comprised of software that is loaded into a memory and is subsequently executed by a processor or server, or other computing component, as described below. The systems, components, generators, identifiers, selectors, and/or logic can also be comprised of different combinations of hardware, software, firmware, etc., some examples of which are described below. These are only some examples of different structures that can be used to form the systems, components, generators, identifiers, selectors, and/or logic described above. Other structures can be used as well.

Figure 13:
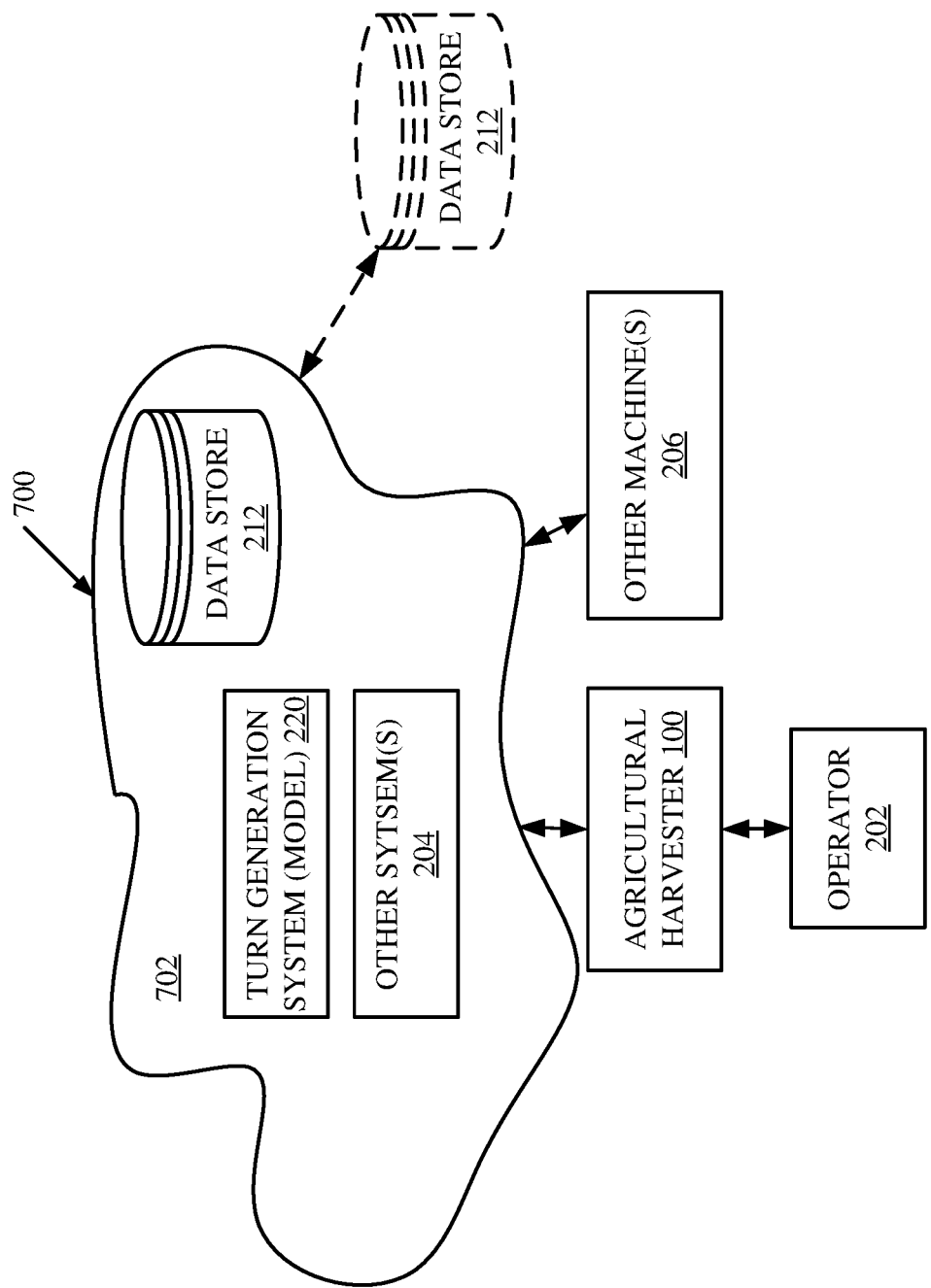
FIG. 13 is a block diagram of one example of the agricultural system illustrated in FIG. 5, deployed in a remote server environment.

FIG. 13 is a block diagram of harvester 100, shown in FIG. 1, except that it communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though the shared data centers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 13, some items are similar to those shown in previous FIGS. and they are similarly numbered. FIG. 13 specifically shows that turn generation system and/or data store 212 and/or other systems 204 can be located at a remote server location 702. Therefore, harvester 100 accesses those systems through remote server location 702.

FIG. 13 also depicts another example of a remote server architecture. FIG. 13 shows that it is also contemplated that some elements of previous FIGS are disposed at remote server location 702 while others are not. By way of example, data store 212 and/or other items can be disposed at a location separate from location 502, and accessed through the remote server at location 702. Regardless of where the items are located, the items can be accessed directly by harvester 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
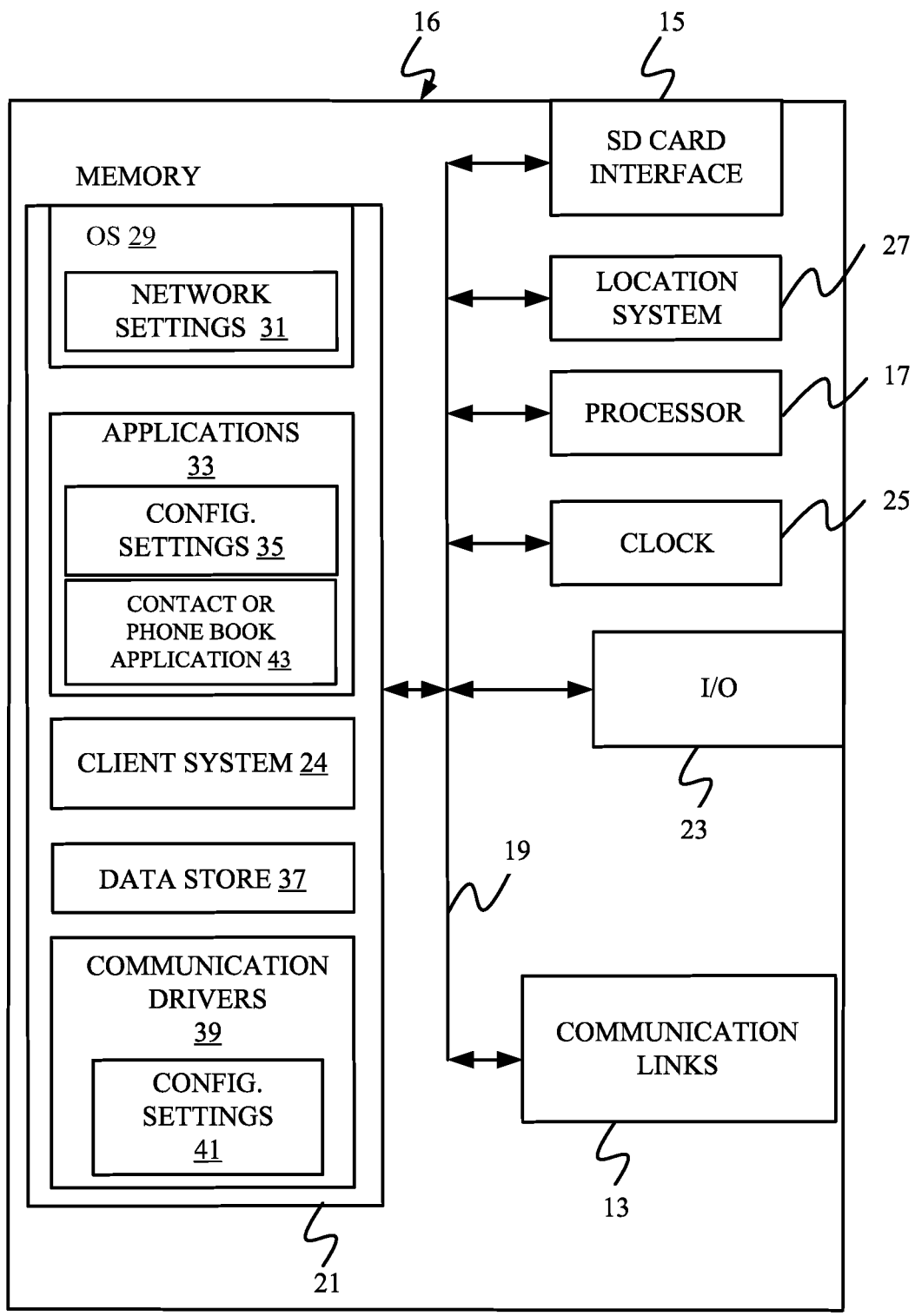
FIGS. 14, 15, and 16 show examples of mobile devices.
Figure 15:
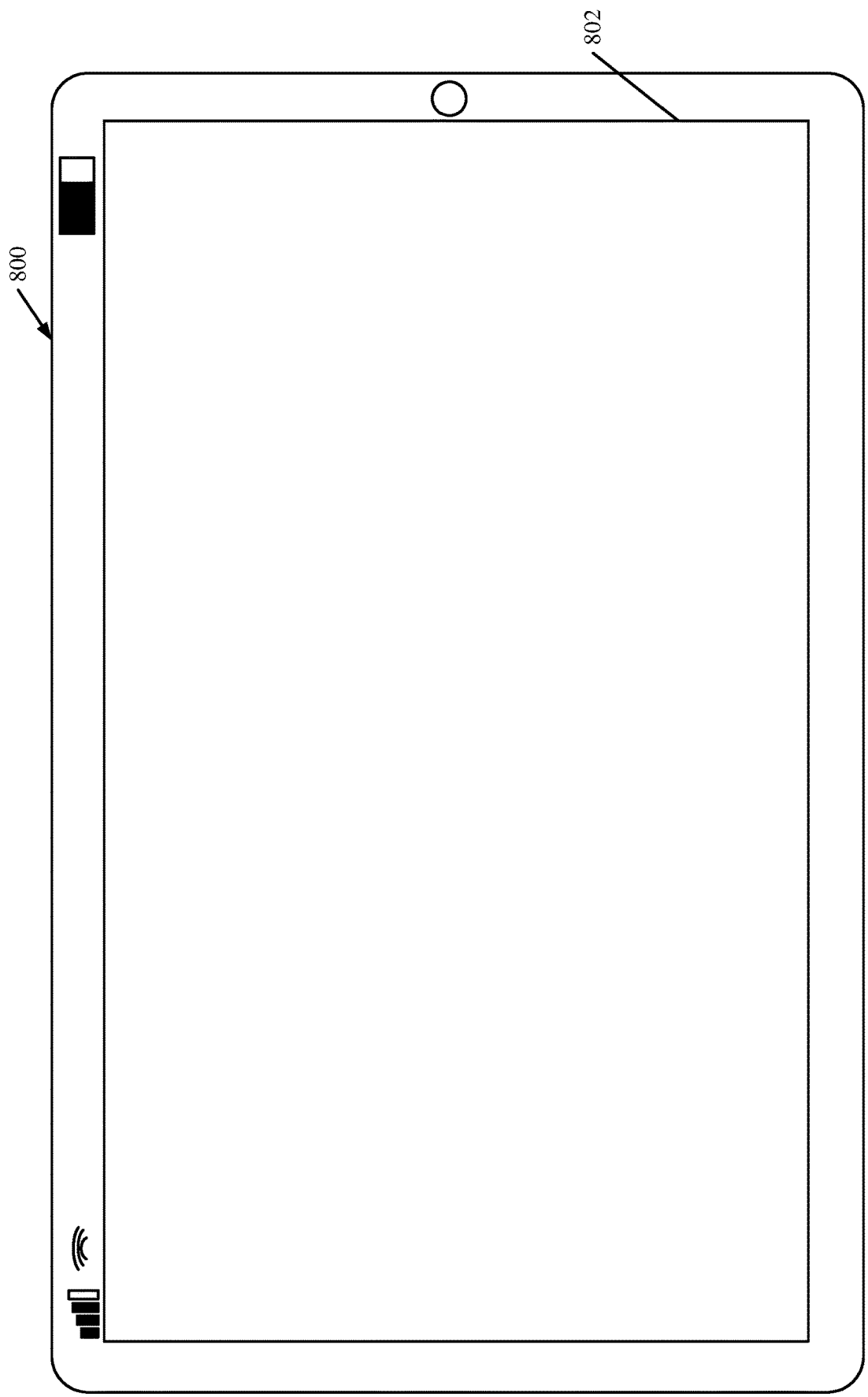
Figure 16:
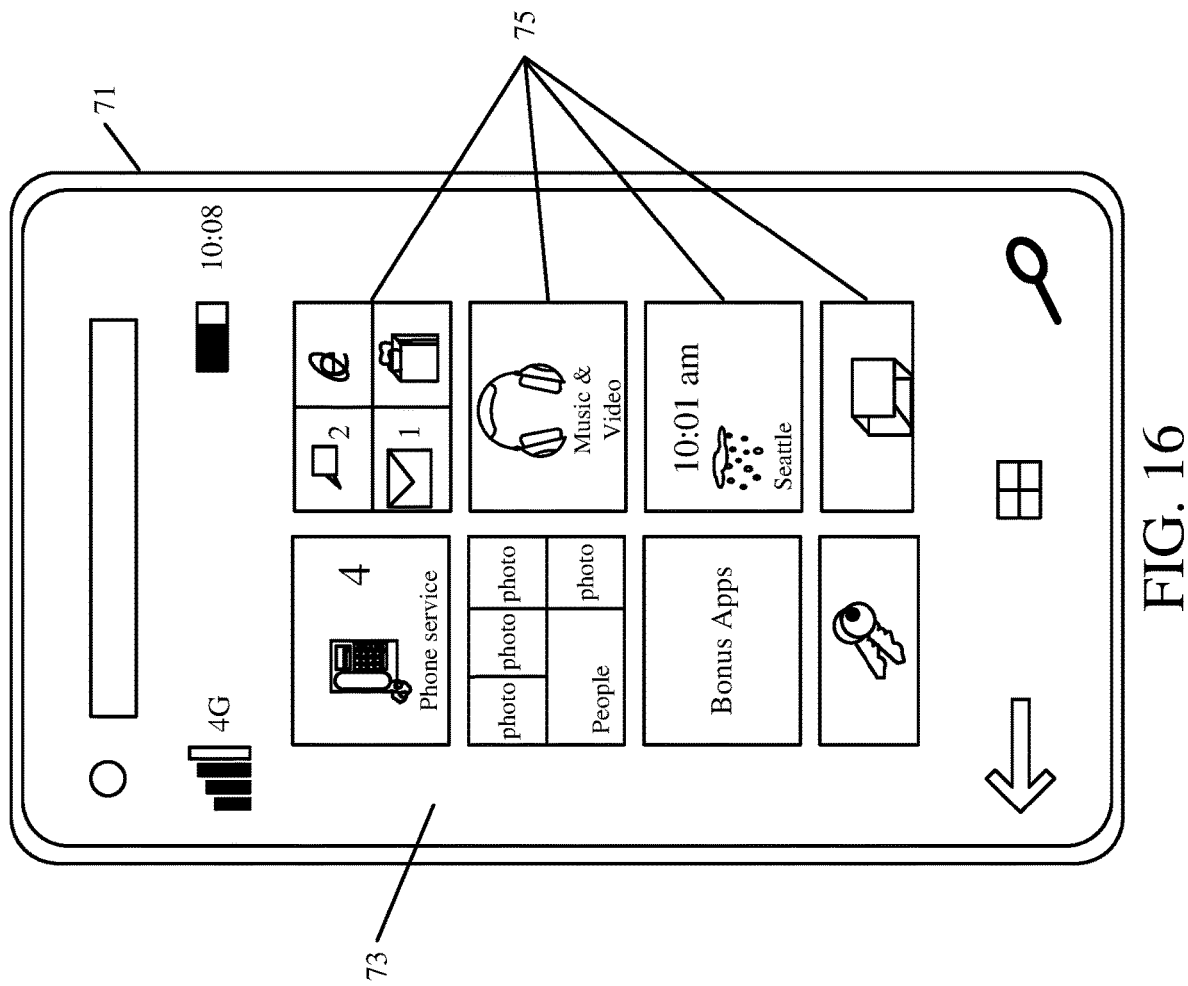

FIG. 14 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 14-16 are examples of handheld or mobile devices.

FIG. 14 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system 11 (GPS) receiver, a LORAN system, a dead reckoning system, a cellular triangulation system, or 12 other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 15 shows one example in which device 16 is a tablet computer 800. In FIG. 15, computer 800 is shown with user interface display screen 802. Screen 802 can be a touch screen or a pen-enabled interface that receives inputs from a pen or stylus. Computer 800 can also use an on-screen virtual keyboard. Of course, computer 800 might also be attached to a keyboard or other user input device through a suitable attachment mechanism, such as a wireless link or USB port, for instance. Computer 800 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
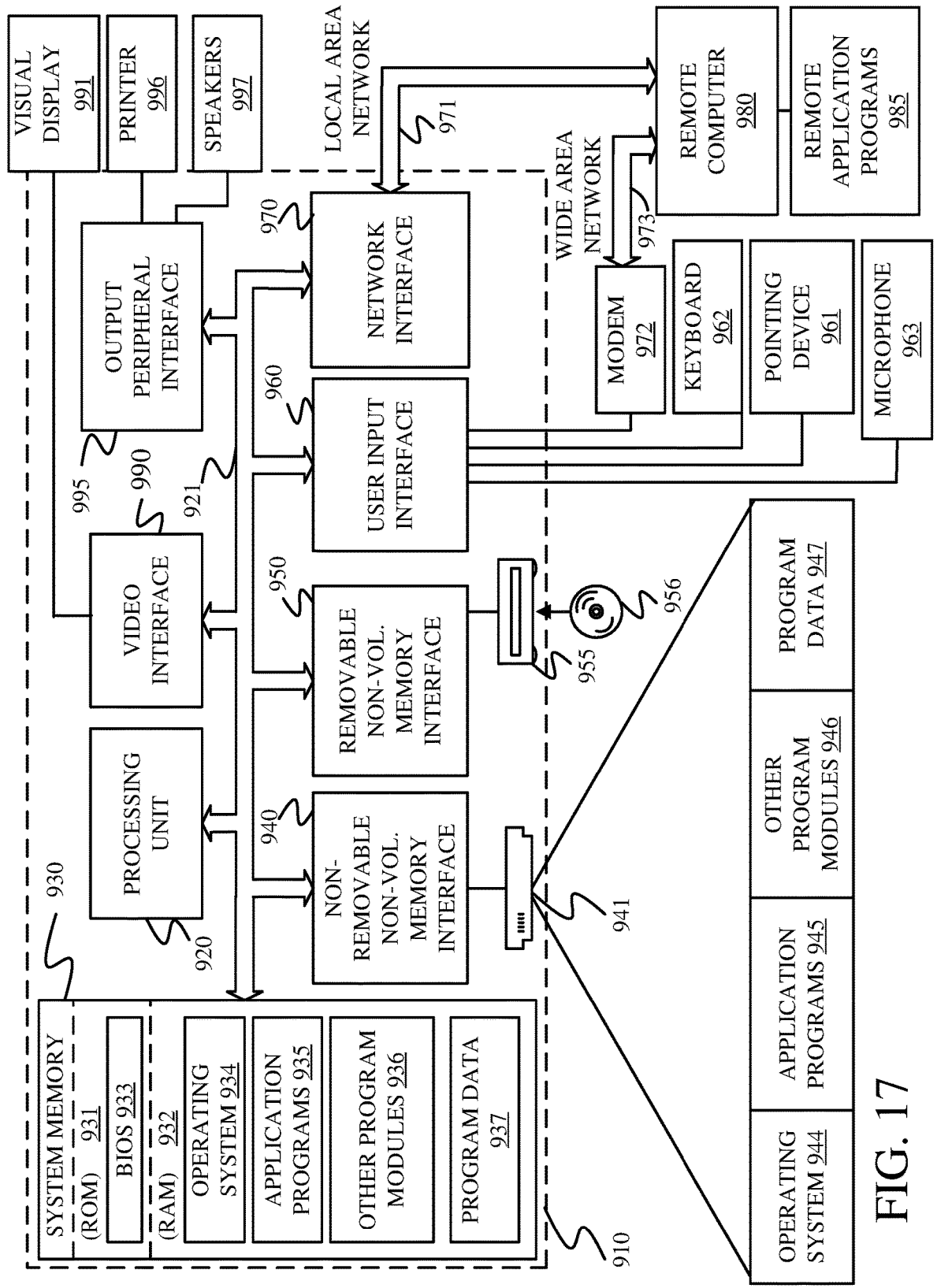
FIG. 17 is a block diagram one example of a computing environment.

FIG. 17 is one example of a computing environment in which elements of previous FIGS., or parts of it, (for example) can be deployed. With reference to FIG. 17, an example system for implementing some embodiments includes a general-purpose computing device in the form of a computer 910 programmed to operate as described above. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to previous FIGS. can be deployed in corresponding portions of FIG. 17.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 17 illustrates operating system 934, application programs 935, other program modules 936, and program data 937.

The computer 910 may also include other removable/non-removable volatile/nonvolatile computer storage media. By way of example only, FIG. 17 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 910. In FIG. 17, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network-CAN, local area network-LAN, or wide area network WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 17 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling an agricultural machine, the method comprising:
   identifying a boundary contour indicative of a contour of a portion of a boundary between a headland area of a field and a primary planted area of a field;
   projecting the boundary contour onto the headland area of the field;
   generating a turn path corresponding to a headland turn between a current pass and a next subsequent pass based on the projected boundary contour, wherein generating the turn path comprises generating a first transition from a transition start point to the projected boundary contour; and
   controlling the agricultural machine to automatically perform the headland turn based on the turn path.

2. The computer implemented method of claim 1 wherein projecting the boundary contour onto the headland area of the field comprises:
   accessing a contour path buffer value; and
   projecting the boundary contour onto the headland area, spacing the boundary contour from the boundary between the headland area of the field and a primary planted area of the field by the contour path buffer value.

3. The computer implemented method of claim 2 wherein generating the turn path further comprises:

generating a second transition from the projected boundary contour to a transition end point.

4. The computer implemented method of claim 3 and further comprising:
identifying whether a first conflict is present by comparing a location of the transition start point to a location of an end point of the current pass; and
identifying whether a second conflict is present by comparing a location of the transition end point to a location of a start point of the next subsequent pass.

5. The computer implemented method of claim 4 wherein projecting the boundary contour onto the headland area, when at least one of the first conflict or the second conflict is present, comprises:
increasing the contour path buffer value to obtain an increased contour path buffer value; and
projecting the boundary contour onto the headland area, spacing the boundary contour from the boundary between the headland area of the field and the primary planted area of the field by the increased contour path buffer value.

6. The computer implemented method of claim 3 wherein projecting the boundary contour onto the headland area comprises:
comparing a location of the first transition to a location of the second transition to determine whether a transition conflict is present indicative of the first and second transitions intersecting with one another; and
if so, generating a transition conflict signal.

7. The computer implemented method of claim 6 wherein generating the turn path further comprises:
generating, as the turn path, a default turn path based on the transition conflict signal.

8. The computer implemented method of claim 1 wherein identifying the boundary contour comprises:
generating a plurality of path points defining a path that the agricultural machine takes as the agricultural machine travels through the headland area.

9. The computer implemented method of claim 8 wherein generating the plurality of path points comprises:
repeatedly sensing a position of the agricultural machine as the agricultural machine travels through the headland area to obtain a set of sensed positions; and
generating the plurality of path points based on the sensed positions of the agricultural machine.

10. The computer implemented method of claim 1 wherein identifying the boundary contour comprises:
accessing a map indicative of a location of a peripheral boundary of the field; and
identifying the boundary contour based on the location of the peripheral boundary of the field.

11. An agricultural machine, comprising:
a steering subsystem;
one or more processors; and
memory storing instructions executable by the one or more processors that, when executed by the one or more processors, configure the agricultural machine to:
identify a boundary contour indicative of a contour of a portion of a boundary of a headland area of a field;
project the boundary contour onto the headland area of the field;
generate a turn path corresponding to a headland turn between a current pass and a next subsequent pass based on the projected boundary contour, the turn path comprising a first transition from a transition start point to the projected boundary contour and a second transition from the projected boundary contour to a transition end point; and
control the steering subsystem to automatically perform the headland turn based on the turn path.

12. The agricultural machine of claim 11 wherein the instructions, when executed by the one or more processors, further configure the agricultural machine to access a contour path buffer value and project the boundary contour onto the headland area, spacing the boundary contour from the boundary between the headland area of the field and a primary planted area of the field by the contour path buffer value.

13. The agricultural machine of claim 12, wherein the instructions, when executed by the one or more processors, further configure the agricultural machine to:
compare a location of the transition start point to a location of an end point of the current pass to identify whether a first conflict is present;
compare a location of the transition end point to a location of a start point of the next subsequent pass to identify whether a second conflict is present; and
generate a conflict signal indicative of whether at least one of the first or second conflict is present.

14. The agricultural machine of claim 13 wherein the instructions, when executed by the one or more processors, further configure the agricultural machine to, based on the conflict signal indicating that at least one of the first conflict or the second conflict is present, increase the contour path buffer value to obtain an increased contour path buffer value and project the boundary contour onto the headland area, spacing the boundary contour from the boundary between the headland area of the field and the primary planted area of the field by the increased contour path buffer value.

15. The agricultural machine of claim 11, wherein the instructions, when executed by the one or more processors, further configure the agricultural machine to:
compare a location of the first transition to a location of the second transition to determine whether a transition conflict is present indicative of the first and second transitions intersecting with one another and if so, generate a transition conflict signal.

16. The agricultural machine of claim 15 wherein the instructions, when executed by the one or more processors, further configure the agricultural machine to:
generate, as the turn path, a default turn path based on the transition conflict signal.

17. An agricultural system, comprising:
at least one processor;
a data store storing computer executable instructions which, when executed by the at least one processor, cause the at least one processor to perform steps comprising:
identifying a boundary contour indicative of a contour of a portion of a boundary between a headland area of a field and a primary planted area of a field;
projecting the boundary contour onto the headland area of the field; and
generating a turn path corresponding to a headland turn between a current pass and a next subsequent pass based on the projected boundary contour, wherein generating the turn path comprises generating a first transition from a transition start point to the projected boundary contour; and
controlling an agricultural machine to automatically perform the headland turn based on the turn path.

18. The agricultural system of claim 17, wherein generating the turn path further comprises generating a second transition from the projected boundary contour to a transition end point.

* * * * *